(12) United States Patent
Yoshida

(10) Patent No.: US 10,400,843 B2
(45) Date of Patent: Sep. 3, 2019

(54) DAMPER

(71) Applicant: Showa Corporation, Gyoda-shi (JP)

(72) Inventor: Kojiro Yoshida, Fukuroi (JP)

(73) Assignee: Showa Corporation, Gyoda-shi (JP)

( * ) Notice: Subject to any disclaimer, the term of this patent is extended or adjusted under 35 U.S.C. 154(b) by 0 days.

(21) Appl. No.: 15/295,861

(22) Filed: Oct. 17, 2016

(65) Prior Publication Data

US 2017/0114856 A1   Apr. 27, 2017

(30) Foreign Application Priority Data

Oct. 26, 2015 (JP) .................................. 2015-210061

(51) Int. Cl.
   *F16F 9/18* (2006.01)
   *F16F 13/06* (2006.01)
   (Continued)

(52) U.S. Cl.
   CPC .............. *F16F 9/185* (2013.01); *F16F 9/062* (2013.01); *F16F 9/084* (2013.01); *F16F 9/49* (2013.01);
   (Continued)

(58) Field of Classification Search
   CPC .... F16F 9/49; F16F 9/585; F16F 9/084; F16F 9/088; F16F 9/092; F16F 9/04
   (Continued)

(56) References Cited

U.S. PATENT DOCUMENTS 2,173,574 A * 9/1939 Binder ...................... F16F 9/48
                                                         188/287
2,332,161 A   10/1943 McIntyre et al.
(Continued)

FOREIGN PATENT DOCUMENTS

DE   1780447 B   3/1972
EP   2865588 A   4/2015
(Continued)

OTHER PUBLICATIONS

Extended European Search Report dated Mar. 20, 2017 for the corresponding European Patent No. 16194107.5.
(Continued)

*Primary Examiner* — Bradley T King
*Assistant Examiner* — James K Hsiao
(74) *Attorney, Agent, or Firm* — Leason Ellis LLP

(57) ABSTRACT

A damper includes a cylinder, a piston, a piston rod, a rod-side fluid chamber, a piston-side fluid chamber, an annular fluid chamber, and a stopper mechanism. The cylinder includes an inner tube and an outer tube. The rod-side fluid chamber is defined by the piston in the inner tube on a lower end side. The piston-side fluid chamber is defined by the piston in the inner tube on an upper end side. The annular fluid chamber is between the inner and outer tubes. At least one communication hole communicates the rod-side fluid chamber with the annular fluid chamber. A communication passage communicates the rod-side fluid chamber with the annular fluid chamber. A check valve in the communication passage allows fluid to flow from the annular fluid chamber to the rod-side fluid chamber and disallows the fluid to flow from the rod-side fluid chamber to the annular fluid chamber.

15 Claims, 10 Drawing Sheets

(51) Int. Cl.
*F16F 9/08* (2006.01)
*F16F 9/084* (2006.01)
*F16F 9/58* (2006.01)
*F16F 9/49* (2006.01)
*F16F 9/06* (2006.01)
*B62K 25/28* (2006.01)
*B62K 25/08* (2006.01)

(52) U.S. Cl.
CPC .............. *F16F 9/585* (2013.01); *F16F 13/06* (2013.01); *B62K 25/08* (2013.01); *B62K 25/283* (2013.01)

(58) Field of Classification Search
USPC .................................................. 267/64.21–42
See application file for complete search history.

(56) References Cited

U.S. PATENT DOCUMENTS

| | | | | | |
|---|---|---|---|---|---|
| 2,698,068 | A | * | 12/1954 | Hein | F16F 9/512 188/129 |
| 2,737,384 | A | * | 3/1956 | Laugaudin | F16F 9/0218 188/317 |
| 3,024,874 | A | | 3/1962 | Koning et al. | |
| 3,063,701 | A | * | 11/1962 | Long, Jr. | B60G 17/04 267/64.24 |
| 3,213,973 | A | * | 10/1965 | Damon | F16F 9/062 188/287 |
| 3,385,590 | A | * | 5/1968 | Avner | B60G 17/04 267/64.24 |
| 3,391,922 | A | * | 7/1968 | Axthammer | B60G 17/044 267/64.17 |
| 3,874,485 | A | * | 4/1975 | Smith | F16F 9/092 188/298 |
| 3,991,863 | A | * | 11/1976 | Lee | F16F 9/44 188/289 |
| 4,022,448 | A | * | 5/1977 | Reeder | F16F 9/084 188/269 |
| 4,132,395 | A | * | 1/1979 | Fox, Jr. | F16F 9/088 137/539 |
| 4,226,408 | A | * | 10/1980 | Tomita | B60G 15/12 188/289 |
| 4,588,171 | A | * | 5/1986 | Stephens | F16F 9/46 188/318 |
| 4,934,667 | A | * | 6/1990 | Pees | B60G 11/64 188/322.17 |
| 5,788,030 | A | * | 8/1998 | Rottenberger | F16F 9/34 188/290 |
| 5,788,031 | A | * | 8/1998 | Saito | B60G 21/0556 188/315 |
| 6,374,966 | B1 | * | 4/2002 | Lillbacka | B60G 15/12 188/266 |
| 6,695,294 | B2 | * | 2/2004 | Miller | B60G 15/08 188/322.18 |
| 6,905,126 | B1 | * | 6/2005 | Jurrens | B60G 15/14 280/284 |
| 6,997,293 | B2 | * | 2/2006 | Tomonaga | B62K 25/08 188/315 |
| 7,959,135 | B2 | * | 6/2011 | Voelkel | B60G 15/14 267/64.21 |
| 8,641,051 | B2 | * | 2/2014 | Pavuk | B60G 17/052 188/275 |
| 8,801,017 | B2 | * | 8/2014 | Ellifson | B60G 13/08 188/281 |
| 9,206,874 | B2 | * | 12/2015 | Sugata | B60G 15/12 |
| 9,290,231 | B1 | * | 3/2016 | Jurrens | F16F 9/084 |
| 9,809,080 | B2 | * | 11/2017 | Ellifson | B60G 17/08 |
| 9,829,036 | B2 | * | 11/2017 | Kondor | F16C 17/04 |
| 2009/0107785 | A1 | * | 4/2009 | Nagai | F16F 9/185 188/315 |
| 2014/0175716 | A1 | * | 6/2014 | Sugata | B60G 15/12 267/64.24 |
| 2015/0217617 | A1 | * | 8/2015 | Leonard | B60G 11/62 280/124.16 |

FOREIGN PATENT DOCUMENTS

| | | |
|---|---|---|
| JP | H02-029339 A | 2/1990 |
| JP | H10-259847 A | 9/1998 |
| JP | H10-10259847 A | 9/1998 |
| JP | 2003-042216 A | 2/2003 |
| JP | 2009-074562 A | 4/2009 |
| JP | 2011-12806 A | 1/2011 |

OTHER PUBLICATIONS

Office Action dated Feb. 26, 2019 for the corresponding Japanese Patent Application 2015-210061 (an English translation attached hereto).

* cited by examiner

DAMPER

CROSS-REFERENCE TO RELATED APPLICATIONS

The present application claims priority under 35 U.S.C. § 119 to Japanese Patent Application No. 2015-210061, filed Oct. 26, 2015. The contents of this application are incorporated herein by reference in their entirety.

BACKGROUND

Field

The present disclosure relates to a damper.

Related Art

Conventionally, a motorcycle includes dampers to absorb impact from the ground so as to improve riding comfort. The dampers include, for example, a cylinder and a piston slidably fitted in the cylinder. Sliding of the piston in the cylinder causes oil to flow, and a flow of the oil is guided into a damping force generator disposed inside or outside of the cylinder. Thus, damping force is generated.

When the piston slides in the cylinder, it is necessary to realize both of two properties. One of them is a sliding property of the piston in the cylinder. The other is a sealing property in sealing up oil in two oil chambers in the cylinder that are defined by the piston so as to prevent the oil from leaking from a gap between the piston and the cylinder so that the oil does not flow between the two oil chambers through the gap. For this purpose, a piston ring is attached to an outer circumference of the piston. A material such as resin is used for the piston ring to secure these two properties.

In some of the dampers, the cylinder has a double-tube configuration including an inner tube and an outer tube. In the double-tube configuration, communication holes that allow oil to flow between the inner tube and the outer tube are formed in the inner tube. Consequently, when sliding of the piston in the inner tube is repeated, the piston ring, which slides on a portion of the inner tube that has the communication holes, may be unfortunately damaged.

In view of this, in the damper with the double-tube configuration, it is necessary to stop the piston itself, to which the piston ring is attached, before the portion of the inner tube that has the communication holes. Thus, the piston does not slide on the portion of the inner tube that has the communication holes.

For example, Japanese Unexamined Patent Application Publication No. 2011-12806 discloses a damper including communication holes in a vicinity of a lower end of an inner tube of a cylinder having the double-tube configuration. Specifically, when a rebound spring is compressed to have the minimum length, the piston is displaced to the lowermost position and stopped there. The communication holes are formed further on a lower end side of a lowermost position of the piston. Thus, the piston ring attached to the outer circumference of the piston is also stopped before the portion of the inner tube that has the communication holes. This prevents the piston ring from being damaged.

This configuration of the damper for preventing damage of the piston ring is not limited to the damper disclosed in Japanese Unexamined Patent Application Publication No. 2011-12806. For example, in a damper for a motorcycle that travels on a highly bumpy ground in a situation such as a motocross, a stopper is disposed at a predetermined distance from a lower end of the piston, and this stopper stops the piston at a time of maximum extension of the damper. Moreover, a rebound spring and a rubber disposed on a lower end side of the stopper absorb impact at the time of maximum extension of the damper.

In this damper, communication holes in the inner tube of the double-tube configuration are formed on a lower end side of the position of the stopper that is stopped at the time of maximum extension of the damper. With this configuration, the piston ring attached to the outer circumference of the piston is stopped before the portion of the inner tube that has the communication holes so as to prevent the piston ring from being damaged.

The damper disclosed in Japanese Unexamined Patent Application Publication No. 2011-12806 includes a cylinder and a piston slidably fitted in the cylinder. The piston slides in the cylinder to cause oil to flow, and a flow of the oil is guided into a damping force generator outside of the cylinder so as to generate damping force.

In a case of the piston in this damper as well, in order to realize the sliding property and the sealing property with respect to the cylinder, a piston ring made of resin is attached to an outer circumference of the piston. The cylinder of the damper also includes an annular chamber between an outer tube and the inner tube. An inside of the inner tube in the damper is defined into a piston-side oil chamber and a rod-side oil chamber by the piston. Oil flows into and from the piston-side oil chamber and the rod-side oil chamber through the annular oil chamber.

This damper includes the damping force generator outside of the cylinder. Consequently, for example, when the piston slides in the cylinder to cause the oil to flow, the oil flows in the rod-side oil chamber, the annular oil chamber, the damping force generator, and the piston-side oil chamber in this order at a rebound stroke, and the oil flows in the piston-side oil chamber, the damping force generator, the annular oil chamber, and the rod-side oil chamber in this order at a compression stroke. In any case, in the damper disclosed in Japanese Unexamined Patent Application Publication No. 2011-12806, the cylinder and the piston function as a pump mechanism to send out the oil.

Detailed description will now be made on a configuration in which the stopper is disposed at a predetermined position on a lower end side of the piston in the damper in which the cylinder and the piston function as the pump mechanism to send out the oil, for example.

FIG. 9 is a partially enlarged, vertically cross-sectional view of a piston 320 and components surrounding it of a pump mechanism 300 in a conventional damper. In FIG. 9, the pump mechanism 300 is extended to the maximum extent.

As illustrated in FIG. 9, the pump mechanism 300 mainly includes such components as a cylinder 311, a piston rod 312, the piston 320, and a rod guide 314.

The cylinder 311 is formed of a double tube including an outer tube 318 and an inner tube 319. Upper ends of the outer tube 318 and the inner tube 319 are closed by a cap (not illustrated). Lower ends of the outer tube 318 and the inner tube 319 are opened. The rod guide 314 is secured in an opening of the outer tube 318. The piston rod 312 slidably penetrates the rod guide 314.

An upper end of the piston rod 312 is attached to the piston 320. A rod end 330 is disposed inside of the upper end of the piston rod 312 so as to fill an opening of the hollow piston rod 312. A lower end of the piston rod 312 is extended outside of the cylinder 311. The piston rod 312 and the piston 320 are inserted together in the inner tube 319. The piston 320 slides on an inner circumference 319$b$ of the inner tube 319. A piston ring 320a made of resin is attached to an outer circumference of the piston 320.

Here, it is noted that "upper end side" refers to an upper side in a direction of a common axis of the cylinder 311 and the piston rod 312, which are coaxial with each other (the same applies below). "Lower end side" refers to a lower side in the direction of the common axis of the cylinder 311 and the piston rod 312, which are coaxial with each other (the same applies below). A vertical direction along the common axis of the cylinder 311 and the piston rod 312, which are coaxial with each other, in FIG. 9 is referred to as an axial direction (the same applies below).

As illustrated in FIG. 9, a stopper 322 is attached to the piston rod 312 on a lower end side of the piston 320 with a collar 315 interposed between the stopper 322 and the piston 320. The piston rod 312 penetrates a center of the stopper 322, and the stopper 322 is secured on the piston rod 312.

The rod guide 314 is, for example, secured to an inner circumference of the lower end of the outer tube 318 in a fluid tight manner. As illustrated in FIG. 9, a stepped portion 314a is formed on an inner circumference of the rod guide 314. This stepped portion 314a is formed of a flat surface perpendicular to the axial direction and extends in a circumferential direction.

An annular stopper receiver 324 is attached to the stepped portion 314a. At a rebound stroke, a lower end 322a of the stopper 322 is brought into contact with this stopper receiver 324 to stop displacement of the piston 320 and the piston rod 312 toward the lower end side. This configuration limits a maximum rebound stroke of the pump mechanism 300. At this time, the collar 315 is interposed between the piston 320 and the stopper 322. Since the collar 315 has a constant length, the position of the piston 320 at a maximum end of the rebound stroke is determined. A lower end 319c of the inner tube 319 is, for example, in contact with an upper end side of the stopper receiver 324.

A support 331 to support an annular rebound rubber 323 is disposed on a lower end side of the stopper receiver 324 and on the inner circumferential side of the rod guide 314. This support 331 is formed of an annular member. At a maximum end of the rebound stroke of the pump mechanism 300, the rebound rubber 323 is brought into contact with the stopper 322 so as to absorb impact at a time of maximum extension of the pump mechanism 300.

An oil chamber 314c is formed around the piston rod 312 and on the inner circumferential side of the support 331 and the rebound rubber 323. A rebound spring 326 is disposed in the oil chamber 314c, and the piston rod 312 penetrates the rebound spring 326. At the maximum end of the rebound stroke of the pump mechanism 300, the rebound spring 326 is brought into contact with the stopper 322 so as to absorb the impact at the time of maximum extension of the pump mechanism 300. In this configuration, the rebound rubber 323 and the rebound spring 326 exclusively absorb the impact at the time of maximum extension of the pump mechanism 300. This, however, should not be construed in a limiting sense. When the stopper receiver 324 is not provided, the rebound rubber 323 and the rebound spring 326 may restrict displacement of the stopper 322 toward the lower end side so as to limit the maximum rebound stroke of the pump mechanism 300. It is noted that the oil chamber 314c is filled with oil as the fluid.

An oil seal 325 is attached to an inner portion of the rod guide 314 in such a manner that the piston rod 312 is slidable in the fluid tight manner. A collar 316 is disposed between the piston rod 312 and the rod guide 314 on a lower end side of the oil seal 325.

An oil chamber 321 in the inner tube 319 is defined into a piston-side oil chamber 321a and a rod-side oil chamber 321b by the piston 320. It is noted that the oil chamber 314c functions as part of the rod-side oil chamber 321b. When the lower end 322a of the stopper 322 is brought into contact with the rebound rubber 323, the oil chamber 314c is closed.

When closed, the oil chamber 314c does not communicate with the rod-side oil chamber 321b between the piston 320 and the stopper 322 and with an annular oil chamber 327, described later. That is, when closed, the oil chamber 314c is sealed. When not closed, the oil chamber 314c communicates with the rod-side oil chamber 321b between the piston 320 and the stopper 322 and with the annular oil chamber 327, described later.

The annular oil chamber 327 is formed between the outer tube 318 and the inner tube 319, which constitute the cylinder 311. The annular oil chamber 327 is filled with the oil. A communication hole 319a is formed in the inner tube 319 on the lower end side. Even at the maximum end of the rebound stroke of the pump mechanism 300, the communication hole 319a is at a position on the lower end side of the piston 320. For example, a plurality of communication holes 319a are formed in the circumferential direction.

As illustrated in FIG. 9, the annular oil chamber 327 communicates with the rod-side oil chamber 321b through the communication holes 319a For example, the annular oil chamber 327 communicates with a damping force generator (not illustrated) through an oil passage (not illustrated) in the cap (not illustrated). For example, the piston-side oil chamber 321a communicates with the damping force generator (not illustrated) through an oil passage (not illustrated) in the cap (not illustrated).

Description will now be made on a flow of the oil in the rod-side oil chamber 321b of the pump mechanism 300 in the conventional damper of the configuration described above.

FIG. 10 is a partially enlarged, vertically cross-sectional view of the piston 320 and the components surrounding it when the piston 320 slides in the inner tube 319 in the pump mechanism 300 of the conventional damper. For ease of description, functions in the compression stroke and the rebound stroke are described using one drawing. In FIG. 10, an oil flow direction at the compression stroke is indicated with solid lines while an oil flow direction at the rebound stroke is indicated with dashed lines. It is noted that at the compression stroke, the piston 320 is displaced toward the upper end side, and that at the rebound stroke, the piston 320 is displaced toward the lower end side.

FIG. 11 is a graph illustrating a relationship between passage resistance and a stroke of the conventional damper. The passage resistance is caused in a gap 328 between the stopper 322 and the inner tube 319 when the piston 320 slides in the inner tube 319 in the pump mechanism 300 of the conventional damper. The oil flows between a side portion 322b of the stopper 322 and the inner circumference of the inner tube 319. Thus, the passage resistance is generated in the gap 328.

First, a rebound stroke will be described.

At the rebound stroke, the piston 320 is displaced toward the lower end side. At this time, oil in the rod-side oil chamber 321b flows through the communication holes 319a on a lower end side of the inner tube 319 to the annular oil chamber 327 between the outer tube 318 and the inner tube 319 (see dashed-line arrows in FIG. 10). The oil, which has flowed into the annular oil chamber 327, is guided to the damping force generator (not illustrated). The flow of the oil is damped by the damping force generator (not illustrated), and the oil flows through the oil passage (not illustrated) in the cap (not illustrated) into the piston-side oil chamber 321a.

When the stopper 322 is displaced in the inner tube 319 toward the lower end side and reaches the communication holes 319a of the inner tube 319, volume of the oil chamber 314c on a lower end side of the stopper 322 is gradually compressed to make the oil on the lower end side of the stopper 322 in the rod-side oil chamber 321b move toward the upper end side, pass the communication holes 319a, and flow into the annular oil chamber 327.

The oil on the lower end side of the stopper 322 in the rod-side oil chamber 321b, which flows toward the communication holes 319a, flows in the gap 328 between the side portion 322b of the stopper 322 and the inner circumference 319b of the inner tube 319. The flow of the oil in the gap 328 generates the passage resistance.

As illustrated in FIG. 11, the passage resistance in the gap 328 increases from a position (that corresponds to point "h" in FIG. 11) in which the lower end 322a of the stopper 322 reaches an upper end U of the communication holes 319a to a position (that corresponds to point "i" in FIG. 11) in which an upper end 322c of the stopper 322 reaches a lower end D of the communication holes 319a After the upper end 322c of the stopper 322 passes the lower end D of the communication holes 319a, the oil flows only in the gap 328. Consequently, the passage resistance in the gap 328 increases until the maximum point "i" and then becomes constant (between point "i" and point "j" in FIG. 11). At the maximum end of the rebound stroke of the pump mechanism 300, not only the rebound spring 326 and the rebound rubber 323 absorb impact of the stopper 322 on the stopper receiver 324 but also the passage resistance in the gap 328 further absorbs the impact.

Next, a compression stroke will be described.

In this description, assume that the compression stroke starts from the maximum end of the rebound stroke of the pump mechanism 300 illustrated in FIG. 9.

At the compression stroke, the piston 320 is displaced toward the upper end side. At this time, oil in the piston-side oil chamber 321a is guided through the oil passage (not illustrated) in the cap (not illustrated) toward the damping force generator (not illustrated). The flow of the oil is damped by the damping force generator (not illustrated), and the oil flows into the annular oil chamber 327. The oil, which has flowed into the annular oil chamber 327, flows through the communication holes 319a on the lower end side of the inner tube 319 into the rod-side oil chamber 321b.

Before the upper end 322c of the stopper 322 approaches the lower end D of the communication holes 319a, the oil, which has flowed from the annular oil chamber 327 into the rod-side oil chamber 321b through the communication holes 319a, flows only in the gap 328 toward the lower end side. Consequently, as illustrated in FIG. 11, constant passage resistance is generated in the gap 328 (between point "j" and point "i" in FIG. 11). Therefore, generation of the passage resistance degrades operability of the piston 320 in the pump mechanism 300 at a start of displacement of the piston 320 that shifts from the rebound stroke to the compression stroke.

As illustrated in FIG. 11, this passage resistance decreases from the position (that corresponds to point "i" in FIG. 11) in which the upper end 322c of the stopper 322 reaches the lower end D of the communication holes 319a to the position (that corresponds to point "h" in FIG. 11) in which the lower end 322a of the stopper 322 reaches the upper end U of the communication holes 319a. After the lower end 322a of the stopper 322 passes the upper end U of the communication holes 319a, the oil does not flow in the gap 328. The reason is that a distance between the piston 320 and the stopper 322 is equal and constant to the length of the collar 315, and an oil chamber between the piston 320 and the stopper 322 in the rod-side oil chamber 321b does not change in volume, and basically, no flow of the oil is generated. Therefore, the passage resistance is not generated in the gap 328 and is constant at 0 (between point "h" and point "g" in FIG. 11).

It is noted that after the lower end 322a of the stopper 322 passes the upper end U of the communication holes 319a, the oil from the communication holes 319a directly flows toward the lower end side of the stopper 322 in the rod-side oil chamber 321b.

SUMMARY

According to one aspect of the present disclosure, a damper includes a cylinder, a piston, a piston rod, a rod-side fluid chamber, a piston-side fluid chamber, an annular fluid chamber, a stopper mechanism, at least one communication hole, a communication passage, and a check valve. In the cylinder, fluid is enclosed, and the cylinder has a double-tube configuration including an inner tube and an outer tube. The piston is slidably fitted in the inner tube. The piston rod includes an upper end attached to the piston and a lower end extending outside of the cylinder. The rod-side fluid chamber is defined by the piston in the inner tube and formed on a lower end side of the piston in an axial direction of the cylinder. The piston-side fluid chamber is defined by the piston in the inner tube and formed on an upper end side of the piston in the axial direction of the cylinder. The annular fluid chamber is between the inner tube and the outer tube. The stopper mechanism is configured to stop the piston when the piston is displaced in the inner tube toward a lowermost side in the axial direction of the cylinder. The at least one communication hole is in the inner tube and on a lower end side of a sliding portion of the inner tube where the piston slides, in the axial direction of the cylinder. The at least one communication hole is configured to allow the annular fluid chamber to communicate with the rod-side fluid chamber. The communication passage is formed on a lower end side of the at least one communication hole in the axial direction of the cylinder and configured to allow the annular fluid chamber to communicate with the rod-side fluid chamber. The check valve is disposed in the communication passage and configured to allow the fluid to flow from the annular fluid chamber to the rod-side fluid chamber and to disallow the fluid to flow from the rod-side fluid chamber to the annular fluid chamber.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENT

Figure 1:
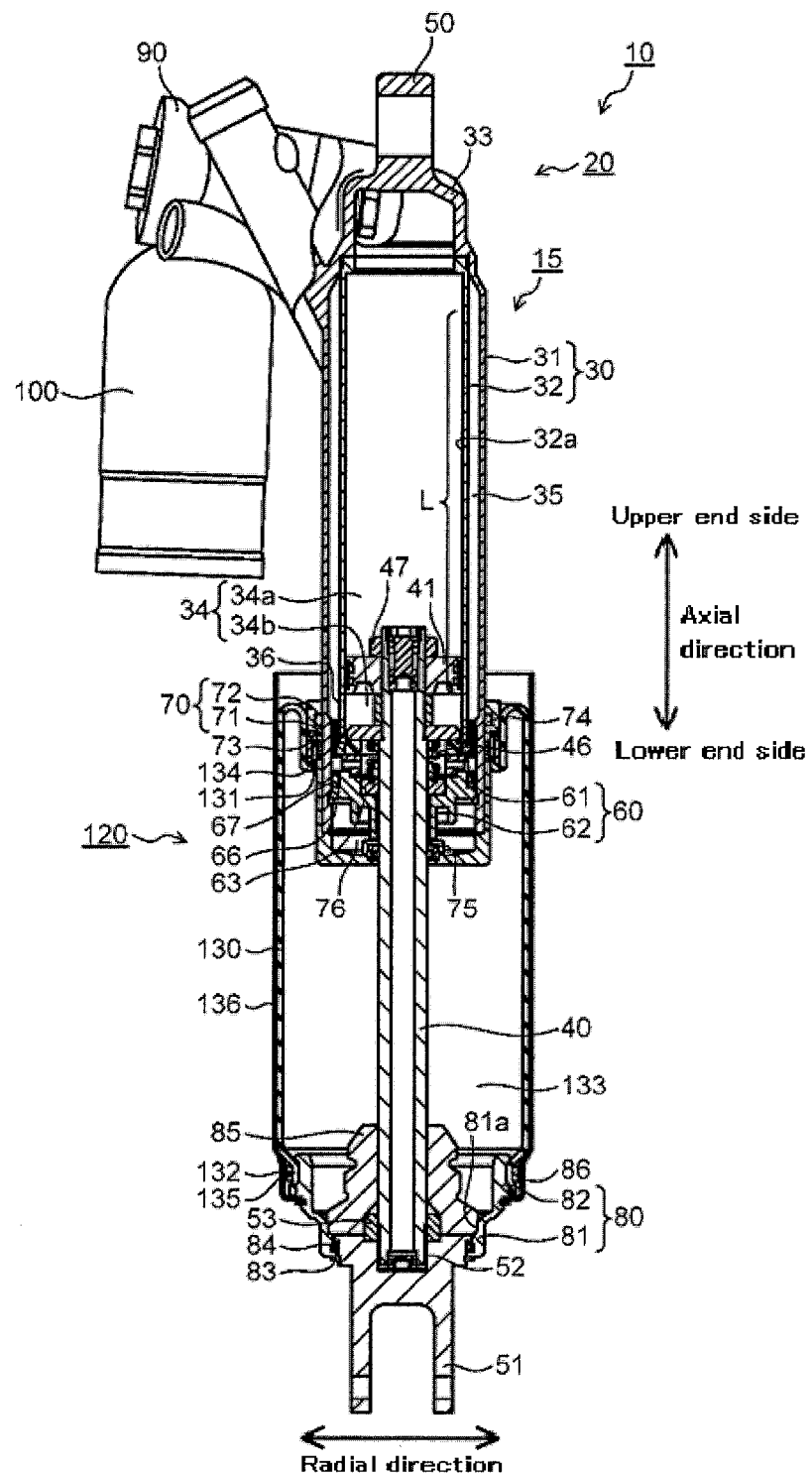
FIG. 1 is a vertically cross-sectional view of a damper according to an embodiment.

The embodiments will now be described with reference to the accompanying drawings, wherein like reference numerals designate corresponding or identical elements throughout the various drawings.

Figure 2:
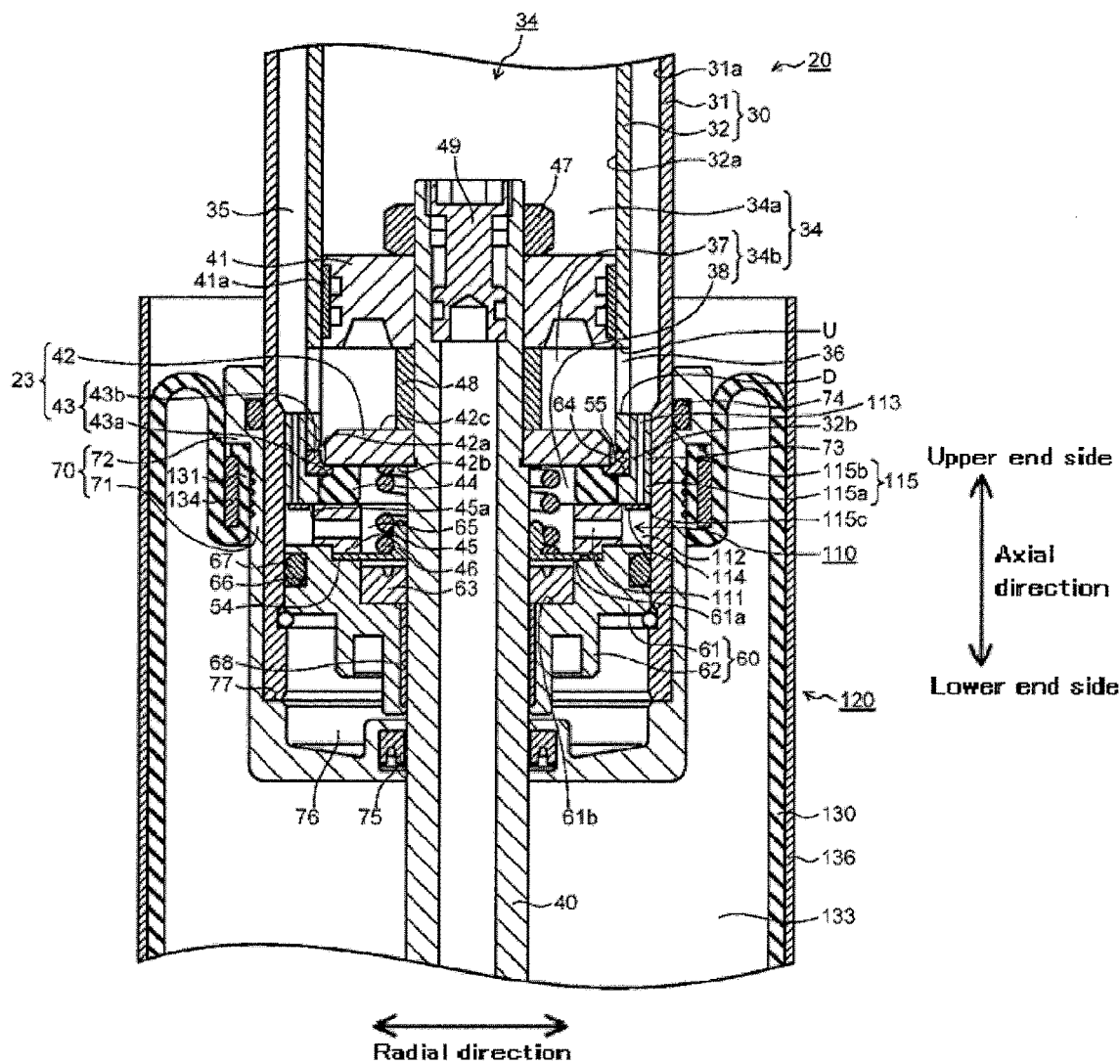
FIG. 2 is a partially enlarged, vertically cross-sectional view of a piston and components surrounding it of the damper according to the embodiment.

FIG. 1 is a vertically cross-sectional view of a damper 10 according to the embodiment FIG. 2 is a partially enlarged, vertically cross-sectional view of a piston 41 and components surrounding it of the damper 10 according to the embodiment FIGS. 1 and 2 illustrate the damper 10 in the most extended state.

As an example of the damper 10 according to the embodiment, an air suspension, what is called air spring damper, will be described below.

As illustrated in FIG. 1, the damper 10 includes a damper main body 20 and a diaphragm structure 120.

First, a configuration of the damper main body 20 will be described.

The damper main body 20 includes components such as a cylinder 30, the piston 41, a piston rod 40, a rod-side oil chamber 34b, a piston-side oil chamber 34a, and an annular chamber 35. Oil as fluid is enclosed in the cylinder 30, which includes an inner tube 32 and an outer tube 31. The piston 41 is slidably fitted in the inner tube 32. The piston rod 40 has an upper end attached to the piston 41 and has a lower end extending outside of the cylinder 30. The rod-side oil chamber 34b is defined by the piston 41 in the inner tube 32 and formed on a lower end side of the piston 41 in the axial direction of the cylinder 30. The piston-side oil chamber 34a is defined by the piston 41 in the inner tube 32 and formed on an upper end side of the piston 41 in the axial direction of the cylinder 30. The annular oil chamber 35 is defined between the inner tube 32 and the outer tube 31. It is noted that the piston-side oil chamber 34a functions as the piston-side fluid chamber, the rod-side oil chamber 34b functions as the rod-side fluid chamber, and the annular oil chamber 35 functions as the annular fluid chamber.

The damper main body 20 further includes a body-side attachment 50, a rod guide 60, an end member 70, a rod-side member 80, an axle-side attachment 51, a damping force generator 90, and a reservoir 100. The body-side attachment 50 is disposed on an upper end of the cylinder 30. The rod guide 60 is disposed on a lower end of the cylinder 30. The end member 70 covers the cylinder 30 and the rod guide 60 from the lower end side. The rod-side member 80 is disposed in the vicinity of a lower end of the piston rod 40. The axle-side attachment 51 is disposed on the lower end of the piston rod 40. The damping force generator 90 to generate damping force and the reservoir 100 are disposed outside of the cylinder 30. It is noted that the damping force generator 90 functions as the damping force generation mechanism.

The cylinder 30, the piston rod 40, the piston 41, the body-side attachment 50, the rod guide 60, the end member 70, the rod-side member 80, and the axle-side attachment 51 constitute a pump unit 15. The pump unit 15 functions to send out the oil to the damping force generator 90 and the reservoir 100, which are disposed outside. In the damper 10 of this configuration, the piston 41 slides in the cylinder 30 to make the oil in the cylinder 30 flow to the damping force generation mechanism.

As illustrated in FIG. 1, the cylinder 30 is formed of a double tube including the outer tube 31 and the inner tube 32. An upper end of the outer tube 31 is closed by a cap 33. An upper end of the inner tube 32 is, for example, in contact with the cap 33 while the upper end of the outer tube 31 is integral with the cap 33. This, however, should not be construed in a limiting sense. The upper end of the outer tube 31 may be separate from the cap 33.

The body-side attachment 50 to be coupled to a vehicle body is disposed on an upper end side of the cap 33. In a non-limiting embodiment, the body-side attachment 50 is integral with the cap 33. The body-side attachment 50, however, may be separate from the cap 33.

The piston 41 is secured on an upper end side of the piston rod 40 through, for example, a nut 47. A piston ring 41a made of resin is attached to the outer circumference of the piston 41.

Lower ends of the outer tube 31 and the inner tube 32 are open. The rod guide 60 is secured in an opening of the outer tube 31. The piston rod 40 penetrates the rod guide 60.

An upper end of the piston rod 40 is attached to the piston 41. A rod end 49 is attached inside of the upper end of the piston rod 40 so as to fill an opening of the hollow piston rod 40. The lower end of the piston rod 40 is extended outside of the cylinder 30. The lower end of the piston rod 40 is coupled to the axle-side attachment 51 to be coupled to an axle. The piston rod 40 and the piston 41, which is slidable in the inner tube 32, are inserted together in the inner tube 32.

In a non-limiting embodiment, when the body-side attachment 50 is coupled to a body side of the vehicle, and when the axle-side attachment 51 is coupled to an axle side of the vehicle, the damper 10 is interposed between the body and the axle. In the damper 10, the cylinder 30 and the piston rod 40 are displaced relative to each other in the axial direction, and thus, the damper 10 is extended and contracted. In accordance with extension and contraction, damping force is generated to suppress vibration of the vehicle body.

Here, it is noted that "upper end side" refers to an upper side in a direction of a common axis of the cylinder 30 and the piston rod 40, which are coaxial with each other (the same applies below). "Lower end side" refers to a lower side in the direction of the common axis of the cylinder 30 and the piston rod 40, which are coaxial with each other (the same applies below). A vertical direction of the common axis of the cylinder 30 and the piston rod 40, which are coaxial with each other, is referred to as the axial direction (the same applies below).

The damper 10 further includes a stopper mechanism 23 to stop the piston 41 when the piston 41 is displaced in the inner tube 32 to a lowermost side in the axial direction of the cylinder 30 (at a time of maximum extension of the damper 10). The stopper mechanism 23 includes a stopper 42 and a stopper receiver 43. The stopper 42 is attached to the piston rod 40. The stopper receiver 43 is attached to a lower end of the inner tube 32.

As illustrated in FIG. 2, the stopper 42 is attached to the piston rod 40 on the lower end side of the piston 41 with a collar 48 interposed between the stopper 42 and the piston 41. Attachment of the collar 48 provides a predetermined distance between the piston 41 and the stopper 42. The piston rod 40 penetrates a center of the stopper 42, and the stopper 42 is secured to the piston rod 40.

The stopper 42 is formed of such an annular member that an outer diameter of the stopper 42 is smaller than an inner diameter of the inner tube 32. That is, the damper 10 has a gap 55 between a side portion 42a of the stopper 42 and an inner circumference 32a of the inner tube 32. The oil flows through the gap 55 to generate passage resistance. Since the stopper 42 is secured to the piston rod 40, a distance between the piston 41 and the stopper 42 is always constant.

The rod-side oil chamber 34b includes an oil chamber 37 and an oil chamber 38. The oil chamber 37 is on the lower end side of the piston 41 and on an upper end side of the stopper 42. The oil chamber 38 is on a lower end side of the stopper 42. The distance of the collar 48 in the axial direction is constant, and the stopper 42 is secured to the predetermined position on the piston rod 40. Consequently, even though the damper 10 is extended and contracted to displace the piston 41 and the stopper 42 in the axial direction, the oil chamber 37 does not vary in volume. With this configuration, no flow occurs in the oil in the oil chamber 37. It is noted that in the state illustrated in FIG. 2, the oil chamber 38 is equivalent to an oil chamber 65, described later.

In a non-limiting embodiment, the rod guide 60 is secured to an inner circumference of the lower end of the outer tube 31. A groove 66 is formed in an outer surface of the rod guide 60 in a circumferential direction. An oil seal 67 is disposed in the groove 66. The oil seal 67 is provided for securing the rod guide 60 in the outer tube 31 in a fluid tight manner.

In a non-limiting embodiment, the rod guide 60 includes a large-diameter cylindrical portion 61 and a small-diameter cylindrical portion 62. The large-diameter cylindrical portion 61 is on the upper end side, and the small-diameter cylindrical portion 62 is on the lower end side. It is noted that the large-diameter cylindrical portion 61 and the small-diameter cylindrical portion 62 are coaxial with each other. An oil seal 63 is disposed on a stepped portion 61b of the large-diameter cylindrical portion 61 of the rod guide 60. Through the oil seal 63, the piston rod 40 is slidable in the rod guide 60 in a fluid tight manner. A collar 68 is disposed between the piston rod 40 and the small-diameter cylindrical portion 62 on a lower end side of the oil seal 63.

A spring bearing 54 is disposed on a stepped portion 61a of the large-diameter cylindrical portion 61 of the rod guide 60. A support 45 is disposed on an outer side of the spring bearing 54 in a radial direction. The support 45 is formed of an annular member of metal, for example.

As illustrated in FIG. 2, a through hole 111 is formed in the support 45 and allows a space 112, described later, and the oil chamber 65, described later, to communicate with each other. In a non-limiting embodiment, the through hole 111 penetrates the support 45 in the radial direction. One or a plurality of through holes 111 are formed. In a non-limiting embodiment, when a plurality of through holes 111 are provided, the through holes 111 are formed at regular intervals in the circumferential direction of the support 45.

A rebound rubber 44 is disposed on an upper end side of the support 45. As illustrated in FIG. 2, the support 45 protrudes to an outer side of the rebound rubber 44 in the radial direction. That is, an outer diameter of an outer portion 45a of the support 45 is larger than an outer diameter of the rebound rubber 44. At a maximum end of the rebound stroke of the damper 10, the rebound rubber 44 is brought into contact with a lower end 42b of the stopper 42 so as to absorb impact on a motorcycle from the ground.

An annular member 115 is attached to an upper end side of an outer edge of the support 45 that protrudes to the outer side of the rebound rubber 44. The annular member 115 includes a small-inner-diameter portion 115a and a large-inner-diameter portion 115b. The large-inner-diameter portion 115b has a larger inner diameter than the small-inner-diameter portion 115a. It is noted that the small-inner-diameter portion 115a has the same outer diameter as the large-inner-diameter portion 115b. The small-inner-diameter portion 115a is disposed between the rebound rubber 44 and the outer tube 31. The large-inner-diameter portion 115b is disposed between the inner tube 32 and the outer tube 31.

The annular space 112 is formed in a gap defined by the annular member 115, the outer portion 45a of the support 45, the rod guide 60, and an inner circumference 31a of the outer tube 31. A through hole 113 is formed in the annular member 115 and allows the annular oil chamber 35 to communicate with the space 112. In a non-limiting embodiment, a plurality of through holes 113 are formed in the circumferential direction.

A stepped portion 64 is formed on a boundary between the small-inner-diameter portion 115a and the large-inner-diameter portion 115b. The stepped portion 64 is formed of a flat surface perpendicular to the axial direction and extends in the circumferential direction.

The annular stopper receiver 43 is attached to an upper end side of the stepped portion 64. The stopper receiver 43 includes a small-inner-diameter portion 43a and a large-inner-diameter portion 43b. The small-inner-diameter portion 43a is on the lower end side. The large-inner-diameter portion 43b is on the upper end side and has a larger inner diameter than that of the small-inner-diameter portion 43a. An outer circumference of the stopper receiver 43 is in contact with an inner circumference of the large-inner-diameter portion 115b of the annular member 115. The stopper receiver 43 is mounted on upper ends of the rebound rubber 44 and the small-inner-diameter portion 115a of the annular member 115.

At the rebound stroke, the lower end 42b of the stopper 42 is brought into contact with the upper end of the small-inner-diameter portion 43a of the stopper receiver 43 so as to stop displacement of the stopper 42 toward a lower end side of the stopper receiver 43. Thus, a position of the piston 41 at the maximum end of the rebound stroke of the damper 10 is determined. In a non-limiting embodiment, the lower end 32b of the inner tube 32 is in contact with an upper end side of the stopper receiver 43.

The stopper mechanism 23 in the damper 10 includes the stopper 42 and the stopper receiver 43. The stopper 42 is attached to the piston rod 40. The stopper receiver 43 is attached to the lower end of the inner tube 32. This, however, should not be construed in a limiting sense. The stopper receiver 43 may be attached to any part of the inner circumference 32a of the inner tube 32 instead of the lower end of the inner tube 32.

The stopper receiver 43 may not necessarily be a separate member from the inner tube 32. The stopper receiver 43 may be integral with the inner tube 32. In this case as well, the stopper receiver 43 may be disposed on the lower end of the inner tube 32 or any part of the inner circumference 32a of the inner tube 32. With this configuration, the stopper mechanism 23 includes the stopper 42 attached to the piston rod 40 and the stopper receiver 43 disposed in the inner tube 32. Instead of providing the stopper mechanism 23 with the stopper 42 and the stopper receiver 43, the rebound rubber 44 and/or the rebound spring 46 may be made to function as members to limit the maximum rebound stroke of the damper 10.

The rebound spring 46 is disposed in the oil chamber 65, which is an annular space defined by the oil seal 63, the rod guide 60, the support 45, the rebound rubber 44, and the piston rod 40. The rebound spring 46 is disposed around the piston rod 40. The rebound spring 46 and the rebound rubber 44 absorb impact of the stopper 42 on the stopper receiver 43 resulting from impact on the damper 10 from the ground. That is, in the damper 10, the rebound spring 46 in the vicinity of the lower end of the cylinder 30 and/or the rebound rubber 44 in the vicinity of the lower end of the inner tube 32 absorb impact when the stopper 42 is displaced to the lowermost side in the axial direction of the cylinder 30 and stopped there (at the time of maximum extension of the damper 10). It is noted that the rebound spring 46 functions as a first elastic member, and the rebound rubber 44 functions as a second elastic member.

The oil chamber 65 is filled with the oil. When the lower end 42b of the stopper 42 is in contact with the rebound rubber 44 or the stopper receiver 43, an opening of the oil chamber 65 on the upper end side is closed. It is noted that the oil chamber 65 constitutes part of the oil chamber 38 in the rod-side oil chamber 34b.

A bottomed, hollow cylindrical end member 70 is disposed on the outer circumference of the outer tube 31 on the lower end side. An upper end of the end member 70 is open, and the end member 70 has a bottom portion on the lower end. In a non-limiting embodiment, an outer diameter of the end member 70 on an opening side (upper end side) is larger than that of the bottom portion. That is, the end member 70 includes a small-diameter cylindrical portion 71 and a large-diameter cylindrical portion 72 that have the same inner diameter. Consequently, a stepped portion 73 is formed on a boundary between the small-diameter cylindrical portion 71 and the large-diameter cylindrical portion 72 and outside in the radial direction. It is noted that the small-diameter cylindrical portion 71 and the large-diameter cylindrical portion 72 are coaxial with each other.

An air seal 74 is disposed in an inner portion of the large-diameter cylindrical portion 72 in the radial direction. Through the air seal 74, the end member 70 is secured to an outer circumference of the outer tube 31 airtightly. The bottom portion of the small-diameter cylindrical portion 71 has an opening through which the piston rod 40 extends. An air seal 75 is disposed in an inner portion of this opening in the radial direction in such a manner that the piston rod 40 is slidable airtightly. In a non-limiting embodiment, the lower end of the outer tube 31 is in contact with a stepped portion 77 of the end member 70 on the lower end side. In the end member 70, a space 76 is defined between the end member 70 and the rod guide 60.

As illustrated in FIG. 1, a portion where the piston 41 slides in the inner circumference 32a of the inner tube 32 from the upper end side to the lower end side is referred to as a sliding portion L. Specifically, the sliding portion L is a range between first and second positions on the inner circumference 32a. The first position on the inner circumference 32a corresponds to a position of the upper end of the piston 41 when the piston 41 is at the uppermost side in the compression stroke. The second position on the inner circumference 32a corresponds to a position of the lower end of the piston 41 when the piston 41 is at the lowermost side in the rebound stroke. At this time, in the compression stroke, when the piston 41 is at the uppermost side, the end member 70 is in contact with a stopper member 85, described later. In the rebound stroke, when the piston 41 is at the lowermost side, the stopper 42 is in contact with the stopper receiver 43.

The damper 10 includes a communication hole 36 in the inner tube 32. The communication hole 36 is provided at a position which is below a lower side of the sliding portion L of the inner circumference 32a of the inner tube 32 in which the piston 41 slides and above an upper end side of a communication passage 110. The communication hole 36 allows the rod-side oil chamber 34b and the annular oil chamber 35 to communicate with each other. That is, the communication hole 36 is formed in such a manner that the communication hole 36 is on the lower end side of the piston 41 even at the maximum end of the rebound stroke of the damper 10. In a non-limiting embodiment, a plurality of communication holes 36 are formed in the circumferential direction. It is noted that as illustrated in FIG. 2, at the maximum end of the rebound stroke of the damper 10, the communication holes 36 are open to the oil chamber 37 of the rod-side oil chamber 34b between the piston 41 and the stopper 42.

As illustrated in FIG. 2, the annular oil chamber 35 communicates with the rod-side oil chamber 34b through the communication holes 36. The annular oil chamber 35 communicates with the damping force generator 90 through an oil passage (not illustrated) formed in the cap 33. The piston-side oil chamber 34a communicates with the damping force generator 90 through an oil passage (not illustrated) formed in the cap 33. That is, the piston-side oil chamber 34a and the rod-side oil chamber 34b each communicate with the damping force generator 90.

As illustrated in FIG. 2, the damper 10 includes the communication passage 110 in the pump mechanism 15. The communication passage 110 is on a lower end side of the communication holes 36 in the axial direction of the cylinder 30. The communication passage 110 allows the annular oil chamber 35 to communicate with the rod-side chamber 34b. That is, the communication passage 110 allows the annular oil chamber 35 to communicate with the oil chamber 65.

In a non-limiting embodiment, the communication passage 110 includes the through holes 111, the space 112, and the through holes 113. The through holes 111 penetrate the support 45 in the radial direction. The space 112 has an annular shape outside of the through holes 111 in the radial direction. The through holes 113 penetrate the annular member 115 in the axial direction, which is disposed on the upper end side of the space 112 in the axial direction.

The space 112 is defined by the rod guide 60, the support 45, the annular member 115, and the outer tube 31. Since the rod guide 60 is secured in the outer tube 31 in a fluid tight manner, the oil does not leak from the space 112 of the communication passage 110 into the end member 70.

A check valve 114 is disposed in the space 112 of the communication passage 110. The check valve 114 allows the oil to flow from the annular oil chamber 35 to the rod-side oil chamber 34b and disallows the oil to flow from the oil chamber 65 to the annular oil chamber 35. The check valve 114 is formed of, for example, an annular flat plate. The check valve 114 is disposed on lower ends of the through holes 113.

In a non-limiting embodiment, the check valve 114 illustrated in FIG. 2 is not fixed on an inner circumferential side and on an outer circumferential side. Consequently, when the oil flows through the through holes 113 toward the lower end side (space 112 side), the check valve 114 is separated toward the lower end side from a lower end 115c of the annular member 115 and opened. The oil, which has passed the through holes 113, flows into the space 112.

The oil, which has flowed into the space 112 from the through holes 111, presses the check valve 114 toward the upper end side so as to close the through holes 113. Consequently, the oil in the space 112 does not flow to the through holes 113. Passage resistance caused when the oil flows and the check valve 114 is separated from the annular member 115 and opened is smaller than passage resistance caused when the oil flows to the gap 55. Therefore, when the oil flows from the annular oil chamber 35 to the oil chamber 65, the oil flows through the through holes 113, rather than the gap 55, to open the check valve 114 and flows into the space 112. With this configuration, when the oil flows from the annular oil chamber 35 to the oil chamber 65, the oil flows through the communication passage 110.

The check valve 114 is not limited to the above-described configuration. The check valve 114 may be partially fixed on the inner circumferential side or the outer circumferential side. A press member may be disposed in the space 112 to press the check valve 114 from the lower end side to an upper end side of the space 112. In this case, the press member is formed of an elastic member such as a spring. With this press member, the check valve 114 is pressed on a lower end 115c of the annular member 115 to close the through holes 113.

Any valve may be used as the check valve 114 insofar as the valve is disposed in the space 112 of the communication passage 110 to allow the oil to flow from the annular oil chamber 35 to the rod-side oil chamber 34b and disallow the oil to flow from the rod-side oil chamber 34b to the annular oil chamber 35. Moreover, any valve may be used as the check valve 114 insofar as the passage resistance caused when the oil flows and the check valve 114 is separated from the annular member 115 and opened is smaller than the passage resistance caused when the oil flows in the gap 55.

With a configuration including the press member, when pressing force of the oil flowing through the through holes 113 to the lower end side (space 112 side) exceeds pressing force of the press member pressing the check valve 114 on the lower end 115c of the annular member 115, the through holes 113 are opened on the lower end side to allow the oil to flow through the through holes 113 into the space 112. Meanwhile, the check valve 114 is not only pressed by the pressing force of the press member but also pressed toward the upper end side by the oil that has flowed into the space 112 through the through holes 111 so as to close the through holes 113. Consequently, the oil does not flow from the space 112 to the through holes 113.

The damping force generator 90 communicates with the reservoir 100. Therefore, the reservoir 100 communicates with the piston-side oil chamber 34a and the rod-side oil chamber 34b through the damping force generator 90, for example. The damping force generator 90 adjusts compression-stroke damping force and rebound-stroke damping force. The reservoir 100 compensates for an oil amount corresponding to volume of a portion of the piston rod 40 that moves into or away from the inner tube 32 of the cylinder 30 (including an oil amount corresponding to thermal expansion of the oil).

The damping force generator 90 may have any configuration insofar as the damping force generator 90 is capable of generating the damping force. In the damper 10 illustrated in FIG. 1, the damping force generator 90 is disposed outside of the cylinder 30. This, however, should not be construed in a limiting sense. When the cylinder 30 has a double-tube configuration, the damping force generator 90 may be disposed inside of the cylinder 30. Any device may be used as the reservoir 100 insofar as the device communicates with the damping force generator 90 and compensates for the oil amount corresponding to the volume of the portion of the piston rod 40 that moves into or away from the oil chamber 34 of the inner tube 32 (including the oil amount corresponding to the thermal expansion of the oil).

As illustrated in FIG. 1, the rod-side member 80 is a hollow cylindrical member having the upper end and the lower end opened. In a non-limiting embodiment, the rod-side member 80 includes a lower small-diameter cylindrical portion 81 and an upper large-diameter cylindrical portion 82. The small-diameter cylindrical portion 81 and the large-diameter cylindrical portion 82 are coaxial with each other. The axle-side attachment 51 is secured to a lower end opening of the small-diameter cylindrical portion 81. Although an example of the rod-side member 80 including the small-diameter cylindrical portion 81 and the large-diameter cylindrical portion 82 is described here, this configuration should not be construed in a limiting sense. The rod-side member 80 may be a hollow cylindrical member having a constant outer diameter.

A groove 83 is formed in the circumferential direction in an inner surface of the small-diameter cylindrical portion 81 of the rod-side member 80. An air seal 84 is disposed in the groove 83. The air seal 84 is provided for making airtight a gap between the inner surface of the small-diameter cylindrical portion 81 and a side portion on an upper end side of the axle-side attachment 51.

As illustrated in FIG. 1, the axle-side attachment 51 includes a securing portion 52 on the upper end surface, for example. The lower end of the piston rod 40 is secured on the securing portion 52 by screw-fastening, for example. Furthermore, in a non-limiting embodiment, a thread portion (not illustrated) is formed on an outer circumference of the lower end of the piston rod 40, and a nut 53 is tightened on the thread portion from the upper end side so as to reliably secure the piston rod 40 on the securing portion 52.

The hollow cylindrical stopper member 85 is disposed in the rod-side member 80 and around the piston rod 40 so as to limit the compression stroke. In a non-limiting embodiment, a lower end of the stopper member 85 is attached to an annular recessed portion 81a formed on the small-diameter cylindrical portion 81 of the rod-side member 80. The stopper member 85 is formed of a material such as urethane and urethane foam.

In a non-limiting embodiment, in order to prevent contact between the end member 70 and the rod-side member 80 at the compression stroke, an outer diameter of the small-diameter cylindrical portion 71 of the end member 70 is smaller than an inner diameter of the large-diameter cylindrical portion 82 of the rod-side member 80.

Next, a configuration of the diaphragm structure 120 will be described.

As illustrated in FIG. 1, the damper 10 includes the diaphragm structure 120 filled with gas and disposed outside of the cylinder 30 and the piston rod 40. The diaphragm structure 120 includes a hollow cylindrical diaphragm 130. The diaphragm 130 is made of an elastic material such as rubber. In a non-limiting embodiment, as illustrated in FIG. 2, an upper attachment end 131 of the diaphragm 130 is secured to an outer circumference on the upper end side of the small-diameter cylindrical portion 71 of the end member 70.

In a non-limiting embodiment, as illustrated in FIG. 1, a lower attachment end 132 of the diaphragm 130 is secured to an outer circumference of the large-diameter cylindrical portion 82 of the rod-side member 80. A groove 86 in the circumferential direction, for example, is formed in the outer circumference of the large-diameter cylindrical portion 82 to which the lower attachment end 132 of the diaphragm 130 is secured. Width of the groove 86 is set to correspond to width of a crimp band 135, described later. The groove 86 is provided for facilitating determination of a securing position and also for preventing the securing position from moving in the axial direction.

In the diaphragm structure 120, the inner diameter of the large-diameter cylindrical portion 82 of the rod-side member 80 to which the lower attachment end 132 of the diaphragm 130 is secured is larger than an attachment diameter of the small-diameter cylindrical portion 71 of the end member 70 to which the upper attachment end 131 of the diaphragm 130 is secured. Consequently, an attachment diameter of the large-diameter cylindrical portion 82 is also larger than the attachment diameter of the small-diameter cylindrical portion 71. An annular space is defined by the diaphragm 130 attached from an upper end side of the end member 70 to the large-diameter cylindrical portion 82 of the rod-side member 80.

In a non-limiting embodiment, metallic crimp bands 134 and 135 are put around the diaphragm 130 and crimped from the outer circumferential side so as to respectively secure the diaphragm 130 on the end member 70 and the rod-side member 80. The crimp bands 134 and 135 may have a C-shape or be annular, for example. Any attachment may be used as the crimp bands 134 and 135 insofar as the attachment is capable of respectively securing the diaphragm 130 on the end member 70 and the rod-side member 80.

In this manner, the diaphragm 130 is provided for forming an air chamber 133 around the cylinder 30 (end member 70) and the piston rod 40. The air chamber 133 is filled with gas.

As the gas to fill the air chamber 133, air and nitrogen can be taken as examples. In a non-limiting embodiment, the gas is supplied from a pipe of a gas supply source through a valve portion (not illustrated) in the rod-side member 80, and the gas is filled in the air chamber 133.

In accordance with extension and contraction of the damper main body 20, the diaphragm 130 is moved up and down along the outer circumference of the large-diameter cylindrical portion 72 of the end member 70 and the outer circumference of the outer tube 31 of the cylinder 30. The air chamber 133 filled with the air under a predetermined pressure constitutes an air spring to elastically move the damper main body 20 in the extension direction. Consequently, spring force is generated in accordance with a change in volume of the air chamber 133 in accordance with the extension and the contraction of the damper main body 20.

As illustrated in FIG. 1, in the diaphragm structure 120 of the damper 10, a cover 136 is attached outside of the diaphragm 130. The cover 136 is made of a material such as metal and resin.

A lower end of the cover 136 is secured to, for example, the large-diameter cylindrical portion 82 of the rod-side member 80. An upper end of the cover 136 is open and extends in the axial direction, for example, until it extends over the upper attachment end 131 of the diaphragm 130 at the maximum rebound stroke of the damper 10 illustrated in FIG. 1. Thus, even in the maximum rebound stroke, the damper 10 is prevented from damage and abrasion of the diaphragm 130 caused by dust, gravel or the like.

In this description, as an example, the damper main body 20 includes the cylinder 30, the piston rod 40, the piston 41, the body-side attachment 50, the rod guide 60, the end member 70, the rod-side member 80, the axle-side attachment 51, the damping force generator 90, and the reservoir 100. This configuration, however, should not be construed in a limiting sense. For example, the diaphragm structure 120 may include some of these components.

Next, functions of the damper 10 in the embodiment will be described.

Figure 3:
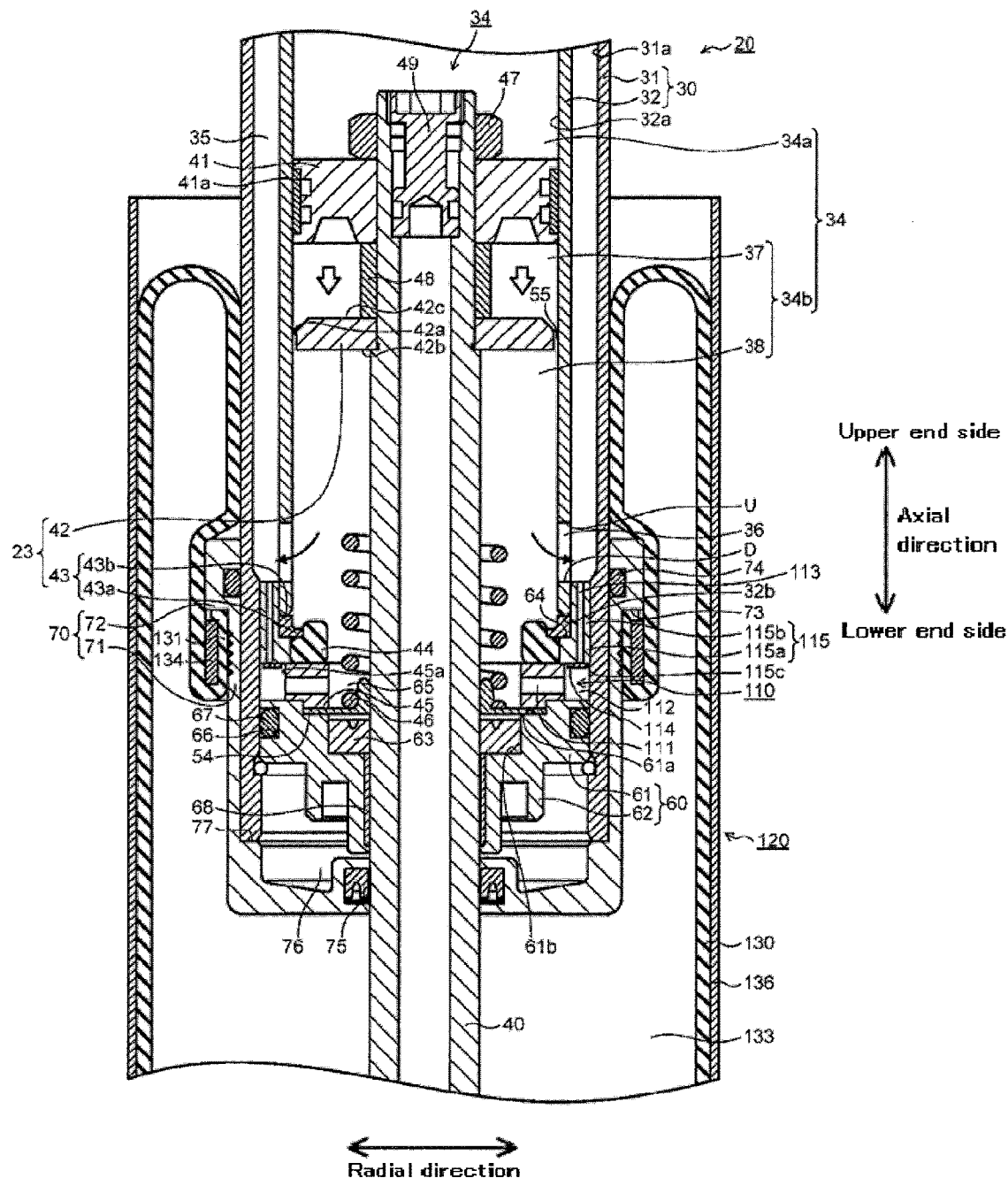
FIG. 3 is a partially enlarged, vertically cross-sectional view of the piston and the components surrounding it of the damper according to the embodiment before a stopper reaches communication holes at a rebound stroke.
Figure 4:
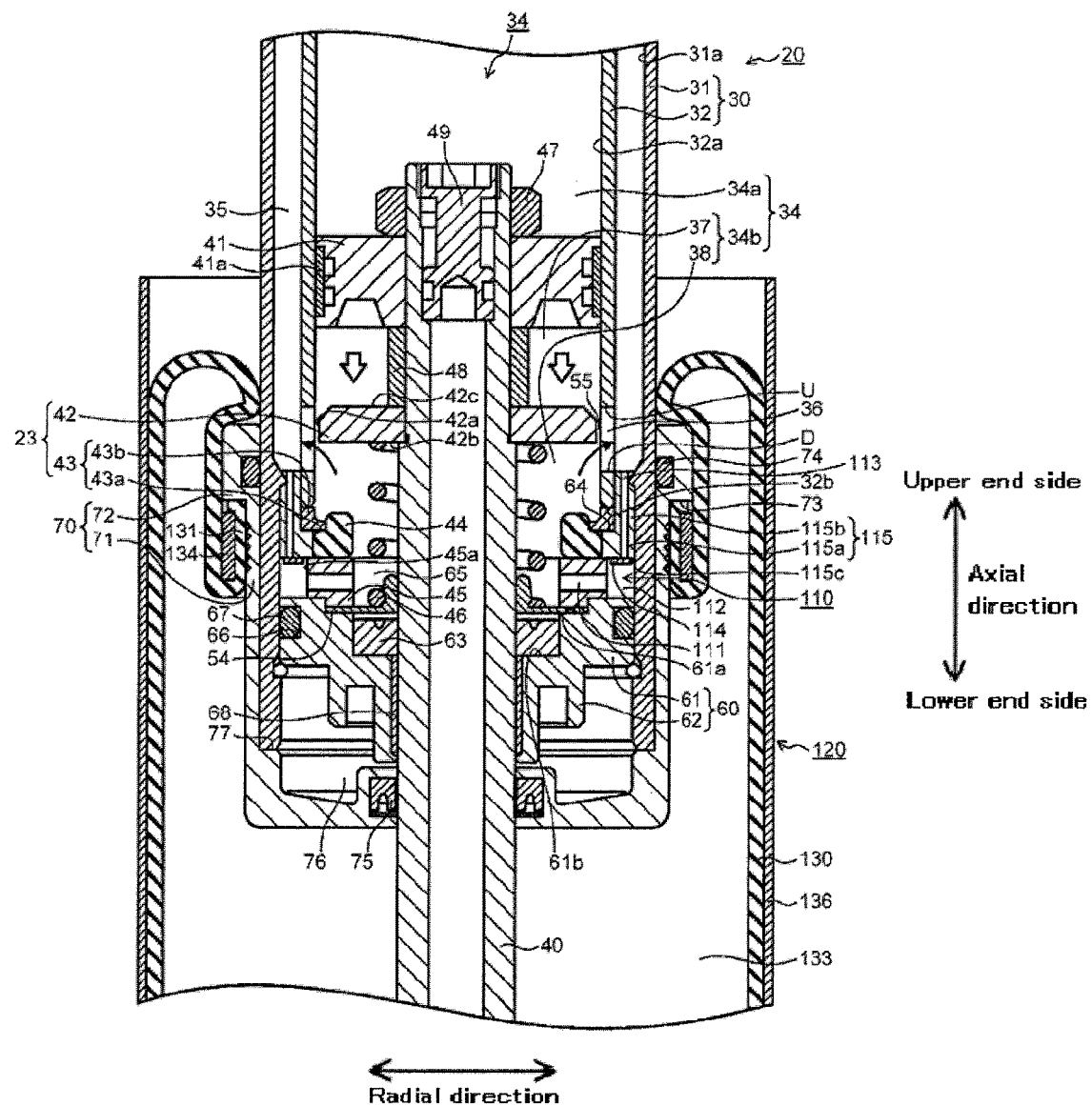
FIG. 4 is a partially enlarged, vertically cross-sectional view of the piston and the components surrounding it of the damper according to the embodiment when the stopper reaches the communication holes at the rebound stroke.
Figure 5:
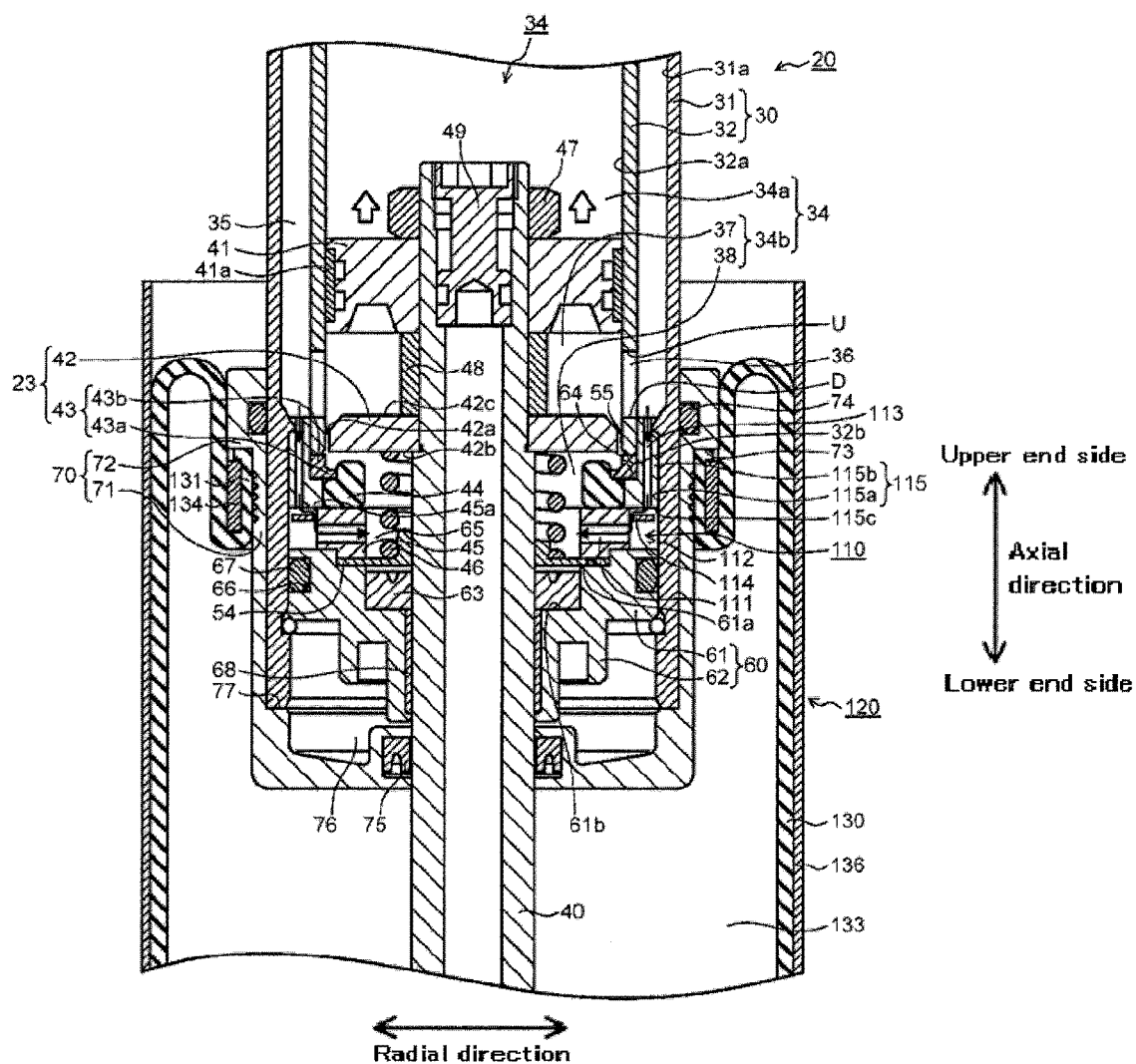
FIG. 5 is a partially enlarged, vertically cross-sectional view of the piston and the components surrounding it of the damper according to the embodiment before the stopper reaches the communication holes at a compression stroke.
Figure 6:
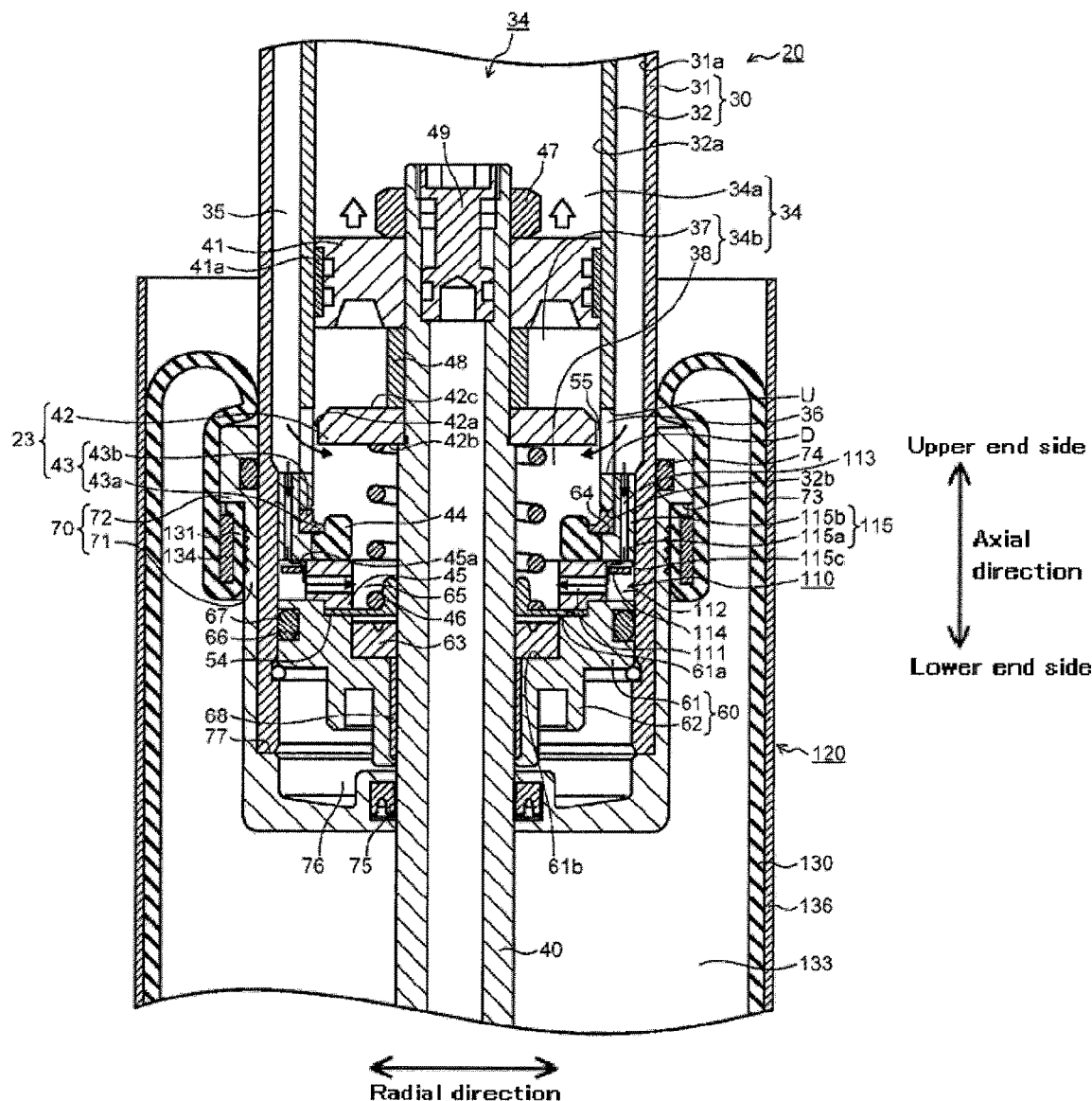
FIG. 6 is a partially enlarged, vertically cross-sectional view of the piston and the components surrounding it of the damper according to the embodiment when the stopper reaches the communication holes at the compression stroke.

FIG. 3 is a partially enlarged, vertically cross-sectional view of the piston 41 and the components surrounding it before the stopper 42 reaches the communication holes 36 at the rebound stroke in the damper 10 in the embodiment. FIG. 4 is a partially enlarged, vertically cross-sectional view of the piston 41 and the components surrounding it when the stopper 42 reaches the communication holes 36 at the rebound stroke in the damper 10 in the embodiment FIG. 5 is a partially enlarged, vertically cross-sectional view of the piston 41 and the components surrounding it before the stopper 42 reaches the communication holes 36 at the compression stroke in the damper 10 in the embodiment. FIG. 6 is a partially enlarged, vertically cross-sectional view of the piston 41 and the components surrounding it when the stopper 42 reaches the communication holes 36 at the compression stroke in the damper 10 in the embodiment. In FIGS. 3 to 6, a flow of the oil is indicated with solid-line arrows, and a direction of displacement of the piston 41 is indicated with outlined arrows.

Figure 7:
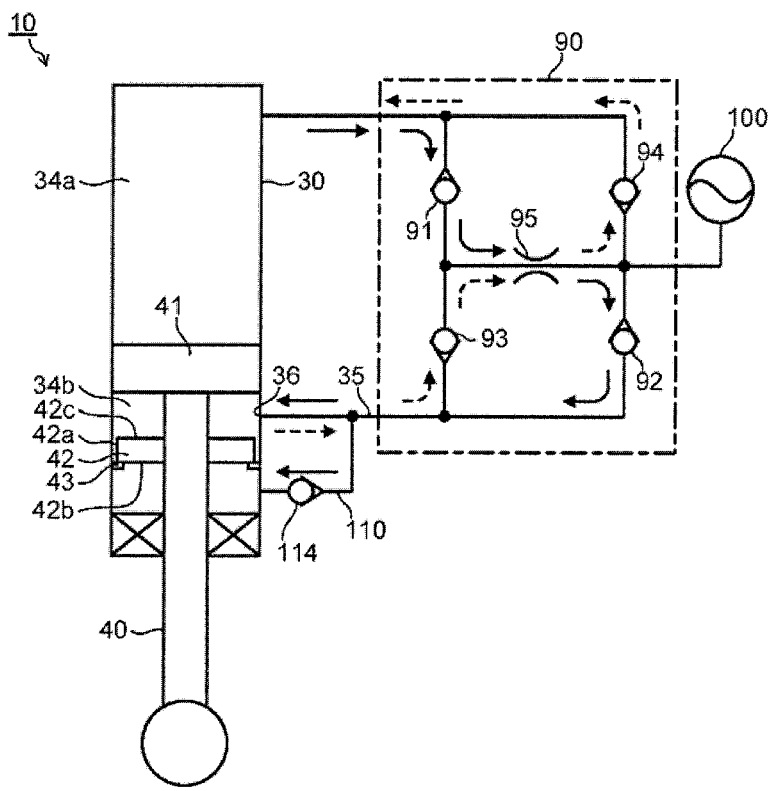
FIG. 7 is a diagram illustrating a hydraulic circuit in the damper according to the embodiment.

FIG. 7 is a diagram illustrating an oil pressure circuit of the damper 10 in the embodiment. In FIG. 7, a flow of the oil at the compression stroke is indicated with solid-line arrows, and a flow of the oil at the rebound stroke is indicated with dashed-line arrows. It is noted that the cylinder 30 in which the piston 41 slides and which is illustrated in the oil pressure circuit of FIG. 7 corresponds to the inner tube 32 illustrated in FIGS. 1 to 6.

Figure 8:
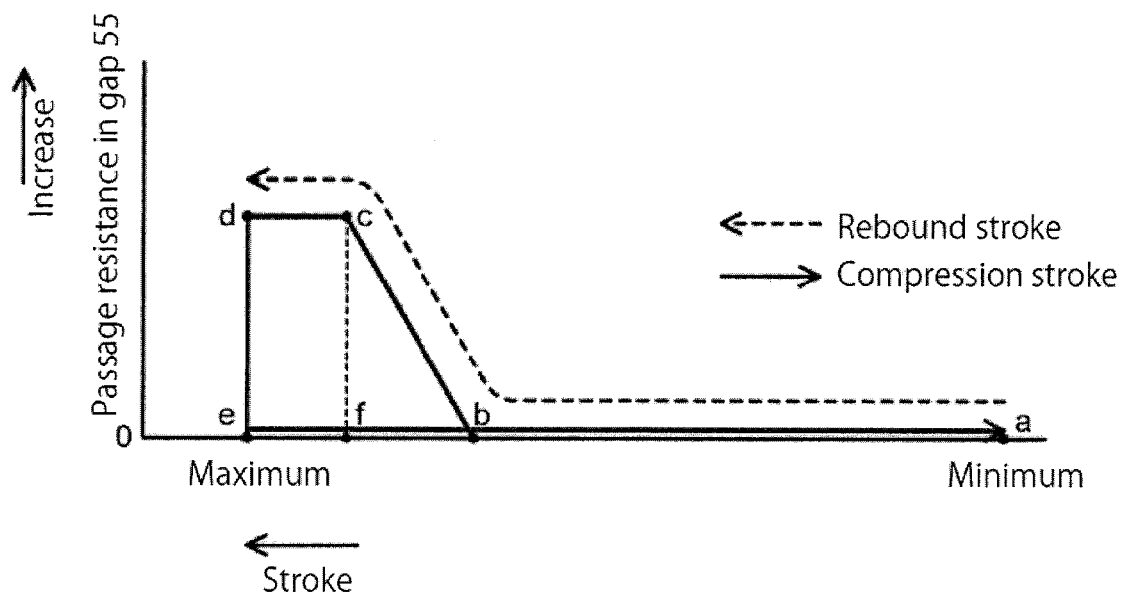
FIG. 8 is a graph illustrating a relationship between passage resistance in a gap between the stopper and an inner tube in the damper according to the embodiment and a stroke of the damper.
Figure 9:
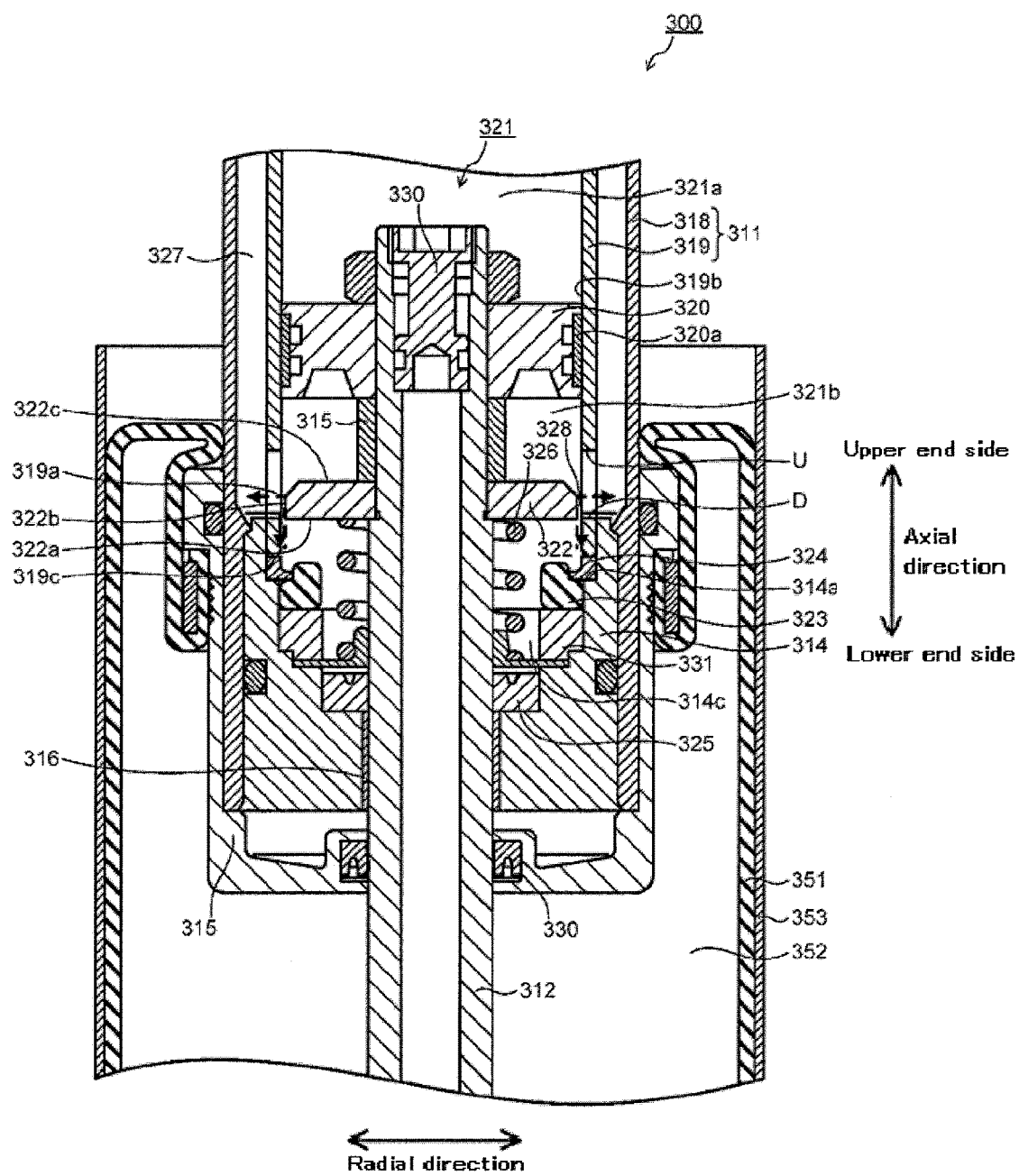
FIG. 9 is a partially enlarged, vertically cross-sectional view of a piston and components surrounding it of a conventional damper.
Figure 10:
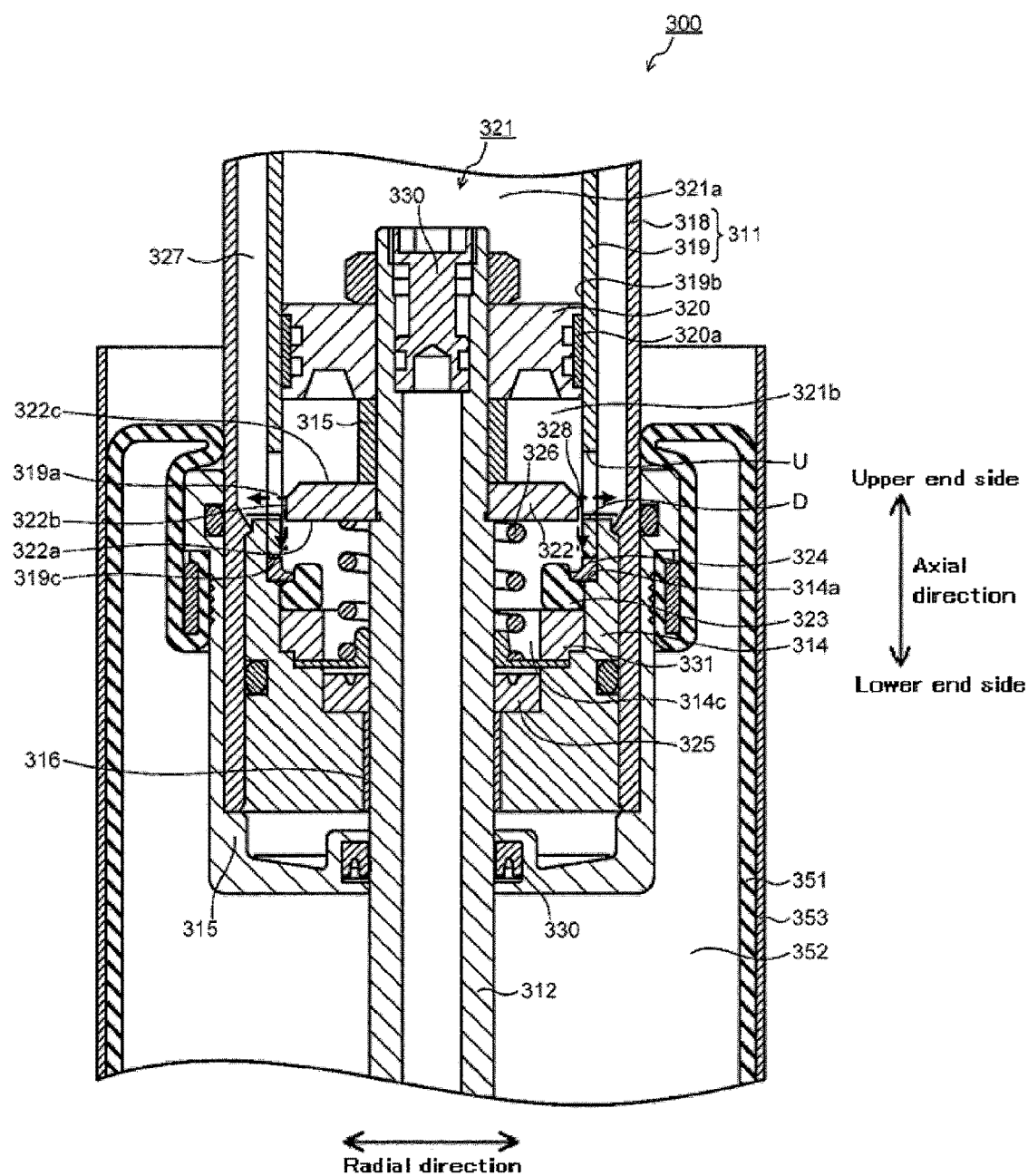
FIG. 10 is a partially enlarged, vertically cross-sectional view of the piston and the components surrounding it when the piston slides in an inner tube of the conventional damper.
Figure 11:
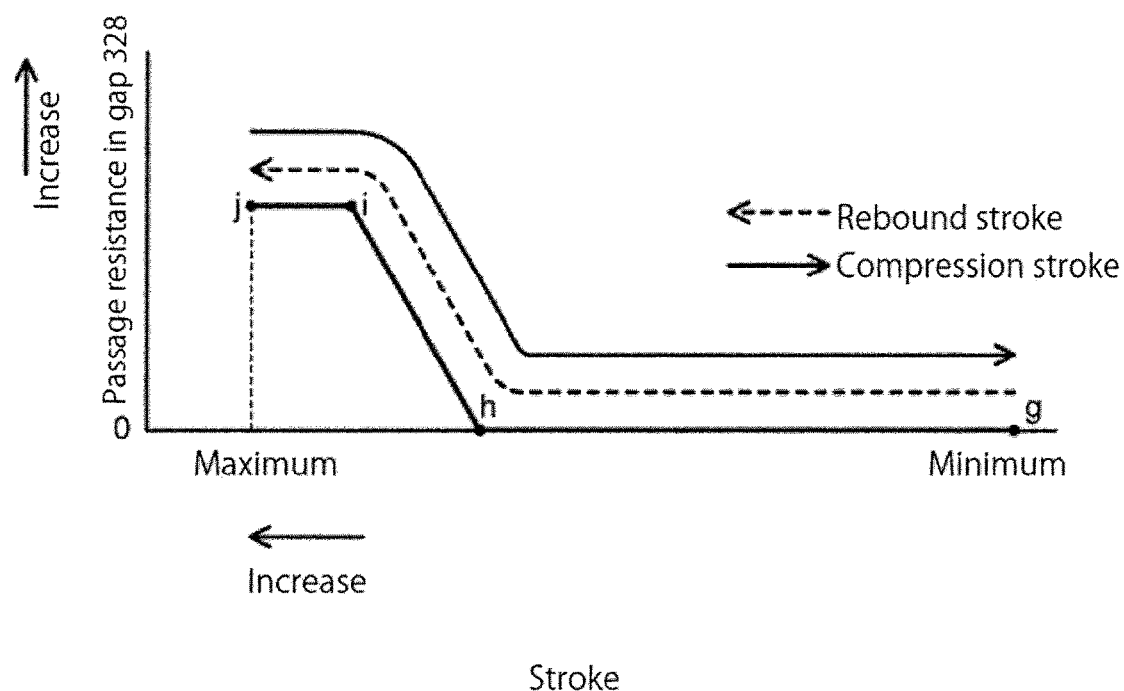
FIG. 11 is a graph illustrating a relationship between passage resistance in a gap between a stopper and the inner tube and a stroke of the damper when the piston slides in the inner tube in the conventional damper.

FIG. 8 is a graph illustrating a relationship between passage resistance in the gap 55 between the stopper 42 and the inner tube 32 in the pump mechanism 15 of the damper 10 in the embodiment and a stroke of the damper 10. In FIG. 8, a range of the compression stroke is indicated by a solid-line arrow, and a range of the rebound stroke is indicated by a dashed-line arrow. It is noted that the passage resistance illustrated in FIG. 8 is passage resistance caused by the oil that flows in the gap between the side portion 42a of the stopper 42 and the inner circumference 32a of the inner tube 32 when the piston 41 slides in the inner tube 32.

Here, functions of the pump mechanism 15 will be mainly described.

Rebound Stroke

A function of the damper 10 at the rebound stroke will be described. First, by referring to FIGS. 3 and 7, a function when the stopper 42 is on an upper end side of the communication holes 36 of the cylinder 30 will be described.

At the rebound stroke in which the piston rod 40 is displaced down (toward the lower end side) relative to the cylinder 30, as illustrated in FIG. 3, the piston 41 and the piston rod 40 are displaced down together in the inner tube 32 of the cylinder 30.

Consequently, the oil in the rod-side oil chamber 34b is compressed by the piston 41, and a pressure therein increases. Then, the oil in the rod-side oil chamber 34b passes the communication holes 36 formed in the inner tube 32 and flows from the oil chamber 38 into the annular oil chamber 35. At this time, the oil in the space 112, which communicates with the oil chamber 65 of the rod-side oil chamber 34b, presses the check valve 114 from the lower end side to the upper end side so as to close the through holes 113. Therefore, the oil in the space 112 does not flow to the annular oil chamber 35. Since the oil in the oil chamber 37 does not flow, the oil in the oil chamber 38 does not flow in the gap 55 until the lower end 42b of the stopper 42 reaches the upper end U of the communication holes 36 of the inner tube 32. As a result, passage resistance due to the oil flowing in the gap 55 is not generated.

It is noted that when the piston 41 and the piston rod 40 are displaced down in the inner tube 32 of the cylinder 30, the volume of the air chamber 133 changes in accordance with the contraction of the damper main body 20, and the diaphragm 130 is displaced toward the lower end side along the outer circumference of the outer tube 31 and the outer circumference of the large-diameter cylindrical portion 72.

The oil, which has flowed into the annular oil chamber 35, flows into the damping force generator 90 through the oil passage (not illustrated) formed in the cap 33 on the upper end of the outer tube 31 illustrated in FIG. 1. In a non-limiting embodiment, as illustrated in FIG. 7, the damping force generator 90 includes a compression-side inlet check valve 91, a compression-side outlet check valve 92, a rebound-side inlet check valve 93, a rebound-side outlet check valve 94, and a throttle portion 95. In FIG. 7, components of the damping force generator 90 are enclosed by a single-dashed line. The damping force generator 90 communicates with the reservoir 100 as well.

As illustrated in FIG. 7, the compression-side inlet check valve 91, the compression-side outlet check valve 92, the rebound-side inlet check valve 93, and the rebound-side outlet check valve 94 allow the oil to flow only in one direction and disallows the oil to flow in the reverse direction. The throttle portion 95 reduces the flow of the oil to generate the damping force. It is noted that the throttle portion 95 illustrated in FIG. 7 is an example of the damping force generator 90, and this configuration should not be construed in a limiting sense. The damping force generator 90 may include components such as a solenoid actuator.

As indicated by the dashed-line arrows in FIG. 7, the oil, which has flowed into the damping force generator 90, passes the rebound-side inlet check valve 93 and flows to the throttle portion 95. The flow of the oil, which has flowed into the throttle portion 95, is damped and passes the rebound-side outlet check valve 94. At this time, an amount of oil corresponding to the volume of the portion of the piston rod 40 that has moved away from the cylinder 30 flows from the reservoir 100 and passes the rebound-side outlet check valve 94 with the oil that has passed the throttle portion 95.

The oil, which has passed the rebound-side outlet check valve 94, flows into the piston-side oil chamber 34a through the oil passage (not illustrated) formed in the cap 33.

Next, by referring to FIGS. 4, 7, and 8, a function when the stopper 42 passes by the communication holes 36 of the cylinder 30 and moves toward the lower end side will be described.

As illustrated in FIG. 4, when the rebound stroke of the damper 10 further increases to make the lower end of the stopper 42 reach the upper end U of the communication holes 36 of the inner tube 32, the stopper 42 begins to close the communication holes 36, and a pressure in the oil chamber 38 on the lower end side of the stopper 42 in the rod-side oil chamber 34b gradually becomes higher.

At this time, the oil in the oil chamber 38 also gradually flows in the gap 55 between the side portion 42a of the stopper 42 and the inner circumference 32a of the inner tube 32. The flow of the oil in the gap 55 causes the passage resistance.

As illustrated in FIG. 8, the passage resistance in the gap 55 increases from a position (that corresponds to point "b" in FIG. 8) at which the lower end 42b of the stopper 42 reaches the upper end U of the communication holes 36 to a position (that corresponds to point "c" in FIG. 8) at which the upper end 42c of the stopper 42 reaches the lower end D of the communication holes 36. After the upper end 42c of the stopper 42 passes the lower end D of the communication holes 36, the oil flows only in the gap 55. Consequently, the passage resistance in the gap 55 becomes constant (between point "c" and point "d" in FIG. 8) after increasing to the maximum point "c". Therefore, at the maximum end of the rebound stroke of the pump mechanism 15, the impact of the stopper 42 on the stopper receiver 43 is absorbed not only by the rebound spring 46 and the rebound rubber 44 but also by the passage resistance in the gap 55.

A function of the oil that flows into the annular chamber 35 through the communication holes 36 is the same as described by referring to FIGS. 3 and 7.

Compression Stroke

A function of the damper 10 at the compression stroke will be described by referring to FIGS. 5 to 8.

In this description, assume that the compression stroke starts from the maximum end of the rebound stroke of the damper 10.

As illustrated in FIG. 5, at the compression stroke at which the piston rod 40 is displaced up (toward the upper end side) relative to the cylinder 30, the piston 41 and the piston rod 40 are displaced up together in the inner tube 32 of the cylinder 30. Consequently, the oil in the piston-side oil chamber 34a is compressed by the piston 41, and a pressure therein increases. Then, the oil in the piston-side oil chamber 34a flows into the damping force generator 90 through the oil passage (not illustrated) formed in the cap 33.

As indicated by the solid-line arrows in FIG. 7, the oil, which has flowed into the damping force generator 90, passes the compression-side inlet check valve 91 and flows to the throttle portion 95. The flow of the oil, which has flowed into the throttle portion 95, is damped and passes the compression-side outlet check valve 92. At this time, of the oil that has passed the throttle portion 95, the amount of the oil that corresponds to the volume of the portion of the piston rod 40 that has moved into the cylinder 30 is guided to the reservoir 100.

The oil, which has passed the compression-side outlet check valve 92, flows into the annular oil chamber 35 through the oil passage (not illustrated) formed in the cap 33. As illustrated in FIG. 5, until the upper end 42c of the stopper 42 reaches the lower end D of the communication holes 36 of the inner tube 32, the oil, which has flowed into the annular oil chamber 35, flows into the oil chamber 65 of the oil chamber 38 of the rod-side oil chamber 34b through the communication passage 110. At this time, the oil, which has flowed into the annular oil chamber 35, flows into the through holes 113.

The oil, which has flowed into the through holes 113, presses the check valve 114, which closes the through holes 113 from the space 112 side, toward the lower end side so as to open the check valve 114. Then, the oil, which has flowed into the through holes 113, flows into the space 112. The oil, which has flowed into the space 112, passes the through holes 111 and flows into the rod-side oil chamber 34b. That is, the oil, which has flowed into the annular oil chamber 35, flows through the communication passage 110 including the through holes 113, the space 112, and the through holes 111.

In this manner, until the upper end 42c of the stopper 42 reaches the lower end D of the communication holes 36 at the compression stroke, the oil, which has flowed into the annular oil chamber 35, passes the communication passage 110 and flows into the oil chamber 65, which is in the rod-side oil chamber 34b on the lower end side of the stopper 42. Consequently, the oil does not flow in the gap 55 toward the lower end side. As illustrated in FIG. 8, therefore, when shifting from the rebound stroke to the compression stroke, until the upper end 42c of the stopper 42 reaches the lower end D of the communication holes 36, the passage resistance, which may be generated by the oil flowing in the gap 55 toward the lower end side, does not occur (corresponding to a range between point "e" and point "f" in FIG. 8).

As illustrated in FIG. 6, when the side portion 42a of the stopper 42 passes by the communication holes 36 of the inner tube 32, the oil, which has flowed into the annular oil chamber 35, is divided into a flow through the communication holes 36 of the inner tube 32 to the oil chamber 38 of the rod-side oil chamber 34b and a flow through the communication passage 110 to the oil chamber 65 of the oil chamber 38 of the rod-side oil chamber 34b. At this time as well, the oil does not flow in the gap 55, and no passage resistance is generated (corresponding to a range between point 'T' and point "b" in FIG. 8).

After the lower end 42b of the stopper 42 passes by the upper end U of the communication holes 36 of the inner tube 32, the oil in the oil chamber 37 does not change in the volume, and the oil does not flow in the gap 55. Thus, no passage resistance is generated (corresponding to a range between point "b" and point "a" in FIG. 8).

That is, as illustrated in FIG. 8, the passage resistance in the gap 55 at the compression stroke described above is not generated from when the damper 10 shifts from the maximum end of the rebound stroke to the compression stroke (corresponding to point "e" in FIG. 8) until the stroke is decreased to the minimum end (corresponding to point "a" in FIG. 8).

It is noted that when the piston 41 and the piston rod 40 are displaced up together in the inner tube 32 of the cylinder 30, the air chamber 133 is changed in the volume in accordance with the extension of the damper main body 20. Accordingly, the diaphragm 130 is moved toward the upper end side along the outer surface of the outer tube 31 and the outer surface of the large-diameter cylindrical portion 72.

The communication passage 110 includes the check valve 114 capable of opening by a flow only in one direction toward the lower end side. Consequently, the passage resistance, which may be generated by the oil flowing in the gap 55, does not occur at the compression stroke. This improves operability of the piston 41 of the damper 10 when shifting from the rebound stroke to the compression stroke. Therefore, when the damper 10 is applied to the motorcycle, it is possible to improve riding comfort when shifting from the rebound stroke to the compression stroke.

As has been described heretofore, the damper 10 in this embodiment includes the communication passage 110 including the check valve 114 capable of opening by the flow only in the one direction described above. With this configuration, the passage resistance in the gap 55 is caused at the maximum end of the rebound stroke so as to absorb impact at the time of maximum extension of the damper 10. Also, the passage resistance in the gap 55 is not caused when shifting from the rebound stroke to the compression stroke so as to improve the operability of the piston 41. Thus, the damper 10 improves riding comfort when shifting from the rebound stroke to the compression stroke.

In this embodiment, the air suspension including the diaphragm structure 120 is taken as an example. This, however, should not be construed in a limiting sense. For example, a configuration of this embodiment may be applied to a damper including a pump unit to send out oil as the fluid to the damping force generator and the reservoir externally provided. It is a matter of course that the configuration of this embodiment may be applied to a damper in which the piston, for example, includes the damping force generator when the damping force generator is not disposed outside of the cylinder but disposed inside of the cylinder.

The configuration of the damper 10 of this embodiment in a rear cushion of the motorcycle has been described above by way of example. Similarly, the damper 10 of this embodiment may be applied to a front fork, for example.

In the pump mechanism 300 of the conventional damper, at the maximum end of the rebound stroke, the passage resistance in the gap 328 increases, and the rebound spring 326 and the rebound rubber 323 absorb impact of the stopper 322 on the stopper receiver 324. At the compression stroke, however, from the maximum end of the rebound stroke until the stopper 322 passes the communication holes 319a, the passage resistance in the gap 328 is generated in a manner similar to the rebound stroke. This degrades the operability of the piston 320. With this configuration, when this damper is applied to the motorcycle, riding comfort is also degraded.

The damper according to the embodiment of the present disclosure improves riding comfort when shifting from a rebound stroke to a compression stroke.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A damper comprising:
    a cylinder in which fluid is enclosed and which has a double-tube configuration comprising an inner tube and an outer tube;
    a piston slidably fitted in the inner tube;
    a piston rod comprising an upper end attached to the piston and a lower end extending outside of the cylinder;
    a rod-side fluid chamber defined by the piston in the inner tube and formed on a lower end side of the piston in an axial direction of the cylinder;

a piston-side fluid chamber defined by the piston in the inner tube and formed on an upper end side of the piston in the axial direction of the cylinder;

an annular fluid chamber provided between the inner tube and the outer tube;

a stopper mechanism configured to stop the piston when the piston is displaced in the inner tube toward a lowermost side in the axial direction of the cylinder, said stopper mechanism containing a stopper attached to the piston rod;

at least one communication hole provided in the inner tube and on the lower end side of a sliding portion of the inner tube where the piston slides, in the axial direction of the cylinder, the at least one communication hole being configured to communicate the rod-side fluid chamber and the annular fluid chamber with each other;

a communication passage formed on the lower end side of the at least one communication hole in the axial direction of the cylinder and configured to communicate the annular fluid chamber and the rod-side fluid chamber with each other;

a check valve disposed in the communication passage and configured to allow the fluid to flow from the annular fluid chamber to the rod-side fluid chamber and to disallow the fluid to flow from the rod-side fluid chamber to the annular fluid chamber;

a first elastic member provided in a vicinity of a lower end of the cylinder; and a second elastic member provided in a vicinity of a lower end of the inner tube, wherein the first elastic member and the second elastic member are configured to abut the stopper to absorb impact when the stopper is displaced toward the lowermost side in the axial direction of the cylinder and stopped.

2. The damper according to claim 1, wherein the stopper mechanism further comprises a stopper receiver disposed in the inner tube.

3. The damper according to claim 2, wherein a gap in which the fluid flows to generate passage resistance is defined between the stopper and the inner tube.

4. The damper according to claim 3, further comprising a damping force generator disposed outside of the cylinder and configured to generate damping force.

5. The damper according to claim 2, further comprising a damping force generator disposed outside of the cylinder and configured to generate damping force.

6. The damper according to claim 1, wherein the stopper mechanism further comprises a stopper receiver disposed on a lower end of the inner tube.

7. The damper according to claim 6, wherein a gap in which the fluid flows to generate passage resistance is defined between the stopper and the inner tube.

8. The damper according to claim 6, further comprising a damping force generator disposed outside of the cylinder and configured to generate damping force.

9. The damper according to claim 1, wherein a gap in which the fluid flows to generate passage resistance is defined between the stopper and the inner tube.

10. The damper according to claim 9, further comprising a damping force generator disposed outside of the cylinder and configured to generate damping force.

11. The damper according to claim 1, further comprising a damping force generator disposed outside of the cylinder and configured to generate damping force.

12. The damper according to claim 11, wherein the piston slides in the cylinder to make the fluid in the cylinder flow to the damping force generator.

13. The damper according to claim 1, further comprising a diaphragm disposed outside of the cylinder and the piston rod and filled with gas.

14. The damper according to claim 13, further comprising a cover disposed outside of the diaphragm.

15. A damper comprising:

a cylinder in which fluid is enclosed and which has a double-tube configuration comprising an inner tube and an outer tube;

a piston slidably fitted in the inner tube;

a piston rod comprising an upper end attached to the piston and a lower end extending outside of the cylinder;

a rod-side fluid chamber defined by the piston in the inner tube and formed on a lower end side of the piston in an axial direction of the cylinder;

a piston-side fluid chamber defined by the piston in the inner tube and formed on an upper end side of the piston in the axial direction of the cylinder;

an annular fluid chamber provided between the inner tube and the outer tube;

a stopper mechanism configured to stop the piston when the piston is displaced in the inner tube toward a lowermost side in the axial direction of the cylinder, said stopper mechanism containing a stopper attached to the piston rod;

at least one communication hole provided in the inner tube and on the lower end side of a sliding portion of the inner tube where the piston slides, in the axial direction of the cylinder, the at least one communication hole being configured to communicate the rod-side fluid chamber and the annular fluid chamber with each other;

a communication passage formed on the lower end side of the at least one communication hole in the axial direction of the cylinder and configured to communicate the annular fluid chamber and the rod-side fluid chamber with each other; and a check valve disposed in the communication passage and configured to allow the fluid to flow from the annular fluid chamber to the rod-side fluid chamber and to disallow the fluid to flow from the rod-side fluid chamber to the annular fluid chamber; and a gap formed between the stopper and the inner tube, wherein the rod-side fluid chamber contains an upper fluid chamber and a lower fluid chamber defined by the stopper, and wherein the fluid flows through the gap to generate passage resistance and the upper fluid chamber communicates with the lower fluid chamber through the gap.

* * * * *